(12) United States Patent
Murthy et al.

(10) Patent No.: US 10,924,414 B2
(45) Date of Patent: Feb. 16, 2021

(54) PROCESSING HIGH VOLUME NETWORK DATA

(71) Applicant: eBay Inc., San Jose, CA (US)

(72) Inventors: Sharad R. Murthy, San Ramon, CA (US); Bhaven Avalani, Cupertino, CA (US); Hongyue Nemo Chen, ShangHai (CN); Tony Chung Tung Ng, San Ramon, CA (US); Weiwei Jin, Shanghai (CN); Xinglang Wang, Shanghai (CN); Mingming Wang, ShangHai (CN); Wei Fang, ShangHai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/545,642

(22) Filed: Aug. 20, 2019

(65) Prior Publication Data

US 2019/0394133 A1    Dec. 26, 2019

Related U.S. Application Data

(63) Continuation of application No. 14/901,395, filed as application No. PCT/CN2015/071452 on Jan. 23, 2015, now Pat. No. 10,425,341.

(51) Int. Cl.
*H04L 29/08* (2006.01)
*H04L 29/06* (2006.01)
(Continued)

(52) U.S. Cl.
CPC .............. *H04L 47/15* (2013.01); *G06F 15/16* (2013.01); *G06F 15/17* (2013.01); *G06Q 10/101* (2013.01);
(Continued)

(58) Field of Classification Search
CPC ...... H04L 67/10; H04L 63/1416; H04L 47/15
See application file for complete search history.

(56) References Cited

U.S. PATENT DOCUMENTS

| 5,852,822 A | 12/1998 | Srinivasan et al. |
| 6,061,690 A | 5/2000 | Nori et al. |

(Continued)

FOREIGN PATENT DOCUMENTS

| CA | 2736282 A1 | 10/2011 |
| CN | 101507270 A | 8/2009 |

(Continued)

OTHER PUBLICATIONS

Final Office Action received for Korean Patent Application No. 10-2017-7023441, dated Jul. 19, 2019, 6 pages (3 pages of English Translation & 3 pages of Official copy).

(Continued)

*Primary Examiner* — Shirley X Zhang
(74) *Attorney, Agent, or Firm* — Holland & Hart LLP

(57) ABSTRACT

Disclosed are a system comprising a computer-readable storage medium storing at least one program, and a computer-implemented method for event messaging over a network. A subscription interface receives data indicative of a subscription request for sessionized data. An allocation module allocates a sessionizer bank linked to the subscription request. A messaging interface module provisions identifiers linked to the respective processing engines of the sessionizer bank. The messaging interface module registers the allocated sessionizer bank as available to process event messages matching the subscription request by providing the provisioned identifiers. The messaging interface module receives event messages from a producer device linked by a collection server to a selected one of the processing engines of the sessionizer bank. The selected one of the processing engine processes the received event messages in accordance (Continued)

with session rule data linked to the subscription request to generate sessionized data.

20 Claims, 17 Drawing Sheets

(51) Int. Cl.
*H04L 12/801* (2013.01)
*G06F 15/17* (2006.01)
*G06F 15/16* (2006.01)
*G06Q 10/10* (2012.01)
*G06Q 20/32* (2012.01)
*G06Q 30/00* (2012.01)
*H04L 12/835* (2013.01)

(52) U.S. Cl.
CPC .......... *G06Q 20/32* (2013.01); *G06Q 30/016* (2013.01); *H04L 47/19* (2013.01); *H04L 47/30* (2013.01); *H04L 63/1416* (2013.01); *H04L 67/10* (2013.01); *H04L 67/26* (2013.01)

(56) References Cited

U.S. PATENT DOCUMENTS

| | | | |
|---|---|---|---|
| 6,662,206 B1 | 12/2003 | Banavar et al. | |
| 7,107,282 B1 | 9/2006 | Yalamanchi | |
| 7,581,170 B2 | 8/2009 | Baumgartner et al. | |
| 7,752,552 B2 | 7/2010 | Pennington et al. | |
| 8,275,816 B1 | 9/2012 | Pegg | |
| 8,296,303 B2 | 10/2012 | Navas | |
| 8,768,805 B2 | 7/2014 | Taylor et al. | |
| 9,094,288 B1* | 7/2015 | Nucci | H04L 43/026 |
| 9,166,892 B1 | 10/2015 | Prado et al. | |
| 9,516,047 B2* | 12/2016 | Rihn | H04L 63/1408 |
| 9,992,269 B1 | 6/2018 | Odom et al. | |
| 10,425,341 B2 | 9/2019 | Murthy et al. | |
| 2001/0032206 A1 | 10/2001 | Seese et al. | |
| 2003/0120720 A1 | 6/2003 | Montero | |
| 2003/0184585 A1 | 10/2003 | Lin et al. | |
| 2003/0208537 A1 | 11/2003 | Lane et al. | |
| 2005/0165925 A1 | 7/2005 | Dan et al. | |
| 2005/0166187 A1 | 7/2005 | Das et al. | |
| 2007/0106537 A1 | 5/2007 | Moore | |
| 2007/0156656 A1 | 7/2007 | Pather et al. | |
| 2008/0086558 A1 | 4/2008 | Bahadori et al. | |
| 2008/0114829 A1 | 5/2008 | Button et al. | |
| 2009/0106617 A1 | 4/2009 | Katis et al. | |
| 2010/0125545 A1 | 5/2010 | Navas | |
| 2010/0125584 A1 | 5/2010 | Navas | |
| 2010/0281539 A1* | 11/2010 | Burns | H04L 63/1441 726/23 |
| 2011/0216665 A1 | 9/2011 | Bali et al. | |
| 2011/0258263 A1 | 10/2011 | Murthy et al. | |
| 2012/0041929 A1 | 2/2012 | Kapoor | |
| 2012/0278473 A1 | 11/2012 | Griffiths | |
| 2013/0067024 A1 | 3/2013 | Vasters | |
| 2013/0173747 A1 | 7/2013 | Kim et al. | |
| 2013/0227139 A1 | 8/2013 | Suffling | |
| 2013/0227193 A1 | 8/2013 | Maitra | |
| 2013/0254132 A1 | 9/2013 | Srinath et al. | |
| 2014/0059551 A1 | 2/2014 | Umanesan | |
| 2014/0172427 A1 | 6/2014 | Liu et al. | |
| 2014/0172506 A1 | 6/2014 | Parsell et al. | |
| 2014/0172992 A1 | 6/2014 | Frederick et al. | |
| 2014/0180815 A1 | 6/2014 | Chatwin et al. | |
| 2014/0279834 A1 | 9/2014 | Tsirogiannis et al. | |
| 2014/0304426 A1 | 10/2014 | Eldar | |
| 2014/0331311 A1* | 11/2014 | Zuk | H04L 63/0236 726/13 |
| 2015/0026794 A1* | 1/2015 | Zuk | H04L 45/64 726/13 |
| 2015/0074191 A1 | 3/2015 | Feng et al. | |
| 2015/0220678 A1 | 8/2015 | Srivastava | |
| 2015/0294431 A1 | 10/2015 | Fiorucci et al. | |
| 2015/0312177 A1 | 10/2015 | Ben-ezra et al. | |
| 2016/0036838 A1* | 2/2016 | Jain | H04L 63/1416 726/23 |
| 2016/0050261 A1 | 2/2016 | Mcdaid et al. | |
| 2016/0085810 A1 | 3/2016 | de castro alves et al. | |
| 2016/0105370 A1 | 4/2016 | Mellor et al. | |
| 2016/0182251 A1 | 6/2016 | Weygandt et al. | |
| 2016/0188426 A1 | 6/2016 | Kousha et al. | |
| 2016/0219089 A1* | 7/2016 | Murthy | H04L 65/4076 |
| 2017/0317935 A1* | 11/2017 | Murthy | H04L 47/19 |
| 2018/0159731 A1* | 6/2018 | Murthy | H04L 12/1859 |

FOREIGN PATENT DOCUMENTS

| | | |
|---|---|---|
| CN | 102222295 A | 10/2011 |
| CN | 103067349 A | 4/2013 |
| CN | 103365907 A | 10/2013 |
| CN | 103501486 A | 1/2014 |
| CN | 104144098 A | 11/2014 |
| CN | 107431664 A | 12/2017 |
| EP | 1418743 A1 | 5/2004 |
| WO | 2004/059923 A2 | 7/2004 |
| WO | 2004/059923 A3 | 11/2004 |
| WO | 2013/142917 A1 | 10/2013 |
| WO | 2016/115734 A1 | 7/2016 |
| WO | 2016/115735 A1 | 7/2016 |
| WO | 2016/118876 A1 | 7/2016 |

OTHER PUBLICATIONS

Office Action received for Korean Patent Application No. 10-2017-7023441, dated Jan. 1, 2019, 8 pages (5 pages of Official copy and 3 pages of English Translation).
Response to Office Action filed on Feb. 28, 2019, for Korean Patent Application No. 10-2017-7023441, dated Jan. 1, 2019, 27 pages(8 pages of English Translation and 19 pages of Official Copy).
Applicant Initiated Interview Summary Received for U.S. Appl. No. 14/604,477 dated Apr. 3, 2018, 3 pages.
Applicant Initiated Interview Summary received for U.S. Appl. No. 14/604,477, dated Jun. 28, 2017, 3 pages.
Applicant-Initiated Interview Summary received for U.S. Appl. No. 14/604,477, dated Aug. 10, 2018, 3 pages.
Final Office Action received for U.S. Appl. No. 14/604,477, dated Jun. 11, 2018, 33 pages.
Final Office Action received for U.S. Appl. No. 14/604,477, dated Apr. 21, 2017, 28 pages.
Non-Final Office Action received for U.S. Appl. No. 14/604,477, dated Nov. 30, 2017, 31 pages.
Non-Final Office Action received for U.S. Appl. No. 14/604,477, dated Nov. 25, 2016, 19 pages.
Notice of Allowance received for U.S. Appl. No. 14/604,477, dated Jan. 14, 2019, 15 pages.
Response to Final Office Action filed on Jul. 21, 2017 for U.S. Appl. No. 14/604,477, dated Apr. 21, 2017, 14 pages.
Response to Final Office Action filed on Oct. 11, 2018, for U.S. Appl. No. 14/604,477, dated Jun. 11, 2018, 21 pages.
Response to Non-Final Office Action filed on Apr. 27, 2018, for U.S. Appl. No. 14/604,477, dated Nov. 29, 2017, 14 pages.
Response to Non-Final Office Action filed on Mar. 24, 2017 for U.S. Appl. No. 14/604,477, dated Nov. 25, 2016, 17 pages.
Applicant Initiated Interview Summary received for U.S. Appl. No. 14/901,376, dated Mar. 20, 2019, 4 pages.
Final Office Action received for U.S. Appl. No. 14/901,376, dated Feb. 1, 2019, 22 pages.
Non-Final Office Action received for U.S. Appl. No. 14/901,376, dated Jun. 27, 2018, 23 pages.
Preliminary Amendment filed on Dec. 28, 2015, for for U.S. Appl. No. 14/901,376, 3 pages.
Response to Final Office Action filed on Apr. 1, 2019, for U.S. Appl. No. 14/901,376, dated Feb. 1, 2019, 13 pages.
Response to Non-Final Office Action filed on Sep. 27, 2018, for U.S. Appl. No. 14/901,376 dated Jun. 27, 2018, 15 pages.

(56) References Cited

OTHER PUBLICATIONS

Extended European Search Report received for European Patent Application No. 15878411.6, dated Dec. 5, 2017, 7 pages.
Response to Extended European Search Report filed on Jun. 21, 2018, for European Patent Application No. 15878411.6, dated Dec. 5, 2017, 20 pages.
Cohen et al., "Descriptive Naming of Context Data Providers", 2005, pp. 112-125.
Khattak et al., "A Taxonomy of Botnet Behavior, Detection, and Defense", Published in IEEE Communications Surveys & Tutorials, vol. 16, Issue 2, 2014, pp. 898-924.
International Preliminary Report on Patentability received for PCT Application No. PCT/CN2015/071442, dated Aug. 3, 2017, 5 pages.
International Search Report received for PCT Application No. PCT/CN2015/071442, dated Oct. 29, 2015, 3 pages.
International Written Opinion received for PCT Application No. PCT/CN2015/071442, dated Oct. 29, 2015, 3 pages.
International Preliminary Report on Patentability received for PCT Application No. PCT/CN2015/071452, dated Aug. 3, 2017, 5 pages.
International Search Report received for PCT Application No. PCT/CN2015/071452, dated Oct. 26, 2015, 3 pages.
International Written Opinion received for PCT Application No. PCT/CN2015/071452, dated Oct. 26, 2015, 3 pages.
International Preliminary Report on Patentability received for PCT Application No. PCT/US2016/014547, dated Aug. 3, 2017, 9 pages.
International Search Report received for PCT Application No. PCT/US2016/014547, dated Mar. 24, 2016, 2 pages.
International Written Opinion received for PCT Application No. PCT/US2016/014547, dated Mar. 24, 2016, 7 pages.
Wikipedia, "Consistent Hashing", Retrieved from the Internet : URL <URL:https://en.wikipedia.org/wlindex.php?title=Consistent_hashing&old- id=637149442>, Accessed on Nov. 20, 2017, Dec. 8, 2014, 4 pages.
Response to Office Action filed on Sep. 20, 2019, for Korean Patent Application No. 10-2017-7023441, dated Jul. 19, 2019, 12 pages (8 pages of Official Copy and 4 pages of English Pending claims).
Corrected Notice of Allowability received for U.S. Appl. No. 14/604,477, dated Oct. 29, 2019, 9 pages.
Final Office Action received for U.S. Appl. No. 14/901,395, dated Sep. 14, 2018, 12 pages.
Non-Final Office Action Received for U.S. Appl. No. 14/901,395 dated Mar. 30, 2018, 11 pages.
Non-Final Office Action received for U.S. Appl. No. 14/901,395, dated Jan. 17, 2019, 8 pages.
Notice of Allowance received for U.S. Appl. No. 14/901,395, dated May 6, 2019, 6 pages.
Preliminary Amendment received for U.S. Appl. No. 14/901,395, filed Dec. 28, 2015, 3 pages.
Response to Final Office Action filed on Oct. 22, 2018, for U.S. Appl. No. 14/901,395, dated Sep. 14, 2018, 13 pages.
Response to Non-Final Office Action filed on Jun. 28, 2018, for U.S. Appl. No. 14/901,395, dated Mar. 30, 2018, 15 pages.
Response to Non-Final Office Action filed on Mar. 19, 2019 for U.S. Appl. No. 14/901,395, dated Jan. 17, 2019, 13 pages.
Supplemental Notice of Allowability Received for U.S. Appl. No. 14/901,395, dated Aug. 12, 2019, 2 pages.
Applicant Initiated Interview Summary received for U.S. Appl. No. 14/901,376, dated Mar. 27, 2020, 3 Pages.
Response to Non-Final Office Action filed on Mar. 16, 2020, for U.S. Appl. No. 14/901,376, dated Dec. 16, 2019, 11 Pages.
Applicant Interview summary received for U.S. Appl. No. 14/901,376 dated Aug. 18, 2020, 3 pages.
Final Office Action received for U.S. Appl. No. 14/901,376, dated Jun. 29, 2020, 19 pages.
Response to Final Office Action filed on Aug. 27, 2020 for U.S. Appl. No. 14/901,376, dated Jun. 29, 2020, 11 pages.
Office Action received for Chinese Patent Application No. 201580074346.9, dated Jul. 6, 2020, 13 pages (6 pages of Official Copy and 7 pages of English Translation).
U.S. Appl. No. 14/901,395, filed Dec. 28, 2010, Issued.
Non Final Office Action Received for U.S. Appl. No. 14/901,376, dated Dec. 16, 2019, 18 pgs.
U.S. Appl. No. 14/604,477, filed Jan. 23, 2015, Systems and Methods for Messaging and Processing High Volume Data Over Networks.
U.S. Appl. No. 14/901,376, filed Dec. 28, 2015, Processing High Volume Network Data.
U.S. Appl. No. 14/901,395 U.S. Pat. No. 10,425,341, filed Dec. 28, 2015, Processing High Volume Network Data.
Advisory Action received for U.S. Appl. No. 14/901,376, dated Oct. 2, 2020, 7 pages.
Pre-Appeal Brief filed on Oct. 29, 2020 for U.S. Appl. No. 14/901,376, 6 pages.
Response to Office Action filed on Sep. 28, 2020 for Chinese Patent Application No. 201580074346.9, dated Jul. 6, 2020, 55 pages (51 pages of official copy & 4 pages of English Translation of claims).

* cited by examiner

PROCESSING HIGH VOLUME NETWORK DATA

CLAIM OF PRIORITY

This application is a Continuation of U.S. application Ser. No. 14/901,395, filed Dec. 28, 2015, which is a U.S. National Stage Filing under 35 U.S.C. 371 from International Application No. PCT/CN2015/071452, filed Jan. 23, 2015, each of which is hereby incorporated by reference in its entirety.

TECHNICAL FIELD

Example embodiments of the present application relate generally to the technical field of data processing.

BACKGROUND

Communications between or among machines may be performed using a publisher-subscriber arrangement. A transmitter machine functions as a message publisher, also known as a message producer. The transmitter machine may transmit (e.g., produce or publish) one or more messages using a network. The transmitter machine sends a message via the network to one or more receiver machines. The message, however, is not addressed to any particular receiver machine. Rather, the transmitter machine sends the message using a multicast network protocol that allows multiple receiver machines to each receive the message. The multicast protocol supports one-to-many communication, and the transmitter machine has no information indicating which specific receiver machine will process the message. In this regard, the multicast communication differs from point-to-point (e.g., one-to-one) communication. A receiver machine functions as a message subscriber, also known as a message consumer. The receiver machine may receive (e.g., consume) the message sent from the transmitter machine. The receiver machine monitors the network for messages sent using the multicast protocol.

BRIEF DESCRIPTION OF THE DRAWINGS

In the drawings, which are not necessarily drawn to scale, like numerals can describe similar components in different views. Like numerals having different letter or numeric suffixes can represent different instances of similar components. The drawings illustrate generally, by way of example, but not by way of limitation, various embodiments discussed in the present document.

DETAILED DESCRIPTION

Figure 1:
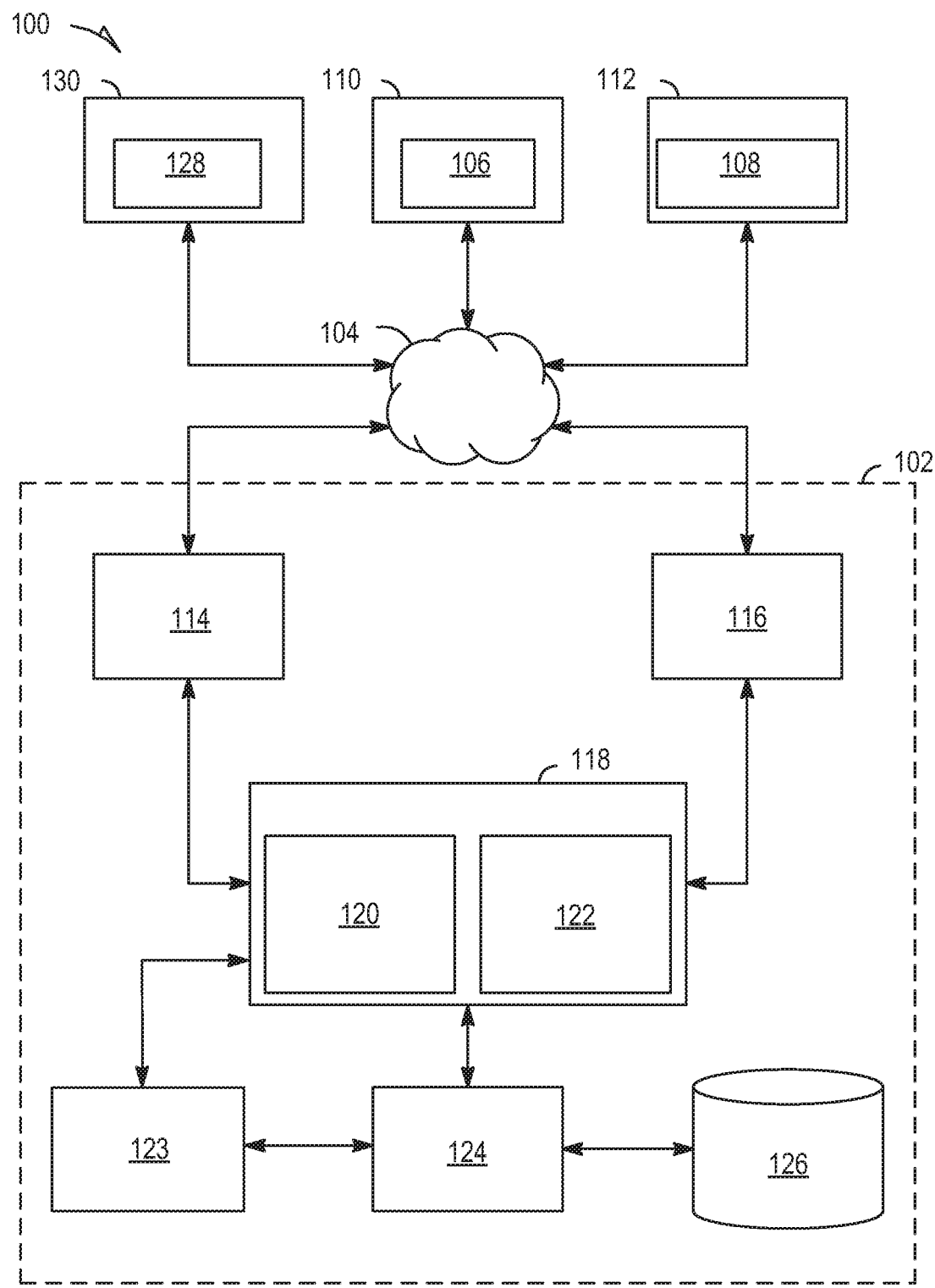
FIG. 1 is a network diagram depicting a client-server system, within which one example embodiment can be deployed.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as can be included within the scope of the disclosure as defined by the appended claims. In the following description, specific details are set forth in order to provide a thorough understanding of the subject matter. Embodiments can be practiced without some or all of these specific details. In addition, well known features may not have been described in detail to avoid unnecessarily obscuring the subject matter.

In accordance with the present disclosure, components, process steps, and/or data structures are implemented using various types of operating systems, programming languages, computing platforms, computer programs, and/or like machines. In addition, those of ordinary skill in the art will recognize that devices, such as hardwired devices, field programmable gate arrays (FPGAs), application specific integrated circuits (ASICs), or the like, can also be used to exploit one or more technical aspects of the devices without departing from the scope of the concepts disclosed herein. Embodiments can also be tangibly embodied as a set of computer instructions stored on a computer readable medium, such as a memory device, to exploit technical aspects of a computer-instruction based embodiments.

Example methods and systems for distributing and/or processing data, which are embodied on electronic devices, are described. In the following description, for purposes of explanation, numerous specific details are set forth in order to provide a thorough understanding of example embodiments. It will be evident, however, to one skilled in the art, that the present inventive subject matter can be practiced without these specific details.

In example embodiments, systems and methods are disclosed for distributing event messages, sessionizing event streams, and managing views of the event streams in real time within networks. For example, real-time complex event processing (CEP) involves processing millions of events per second. In some scenarios, CEP can involve ingestion of event streams at very high velocity (e.g., up to 1 million events per sec), volume (e.g., terabytes of data), and/or variety (e.g., unstructured and semi structured data). CEP engines are CEP instances used to analyze event streams to compute aggregates for the tuples of information or a combination of tuples of information contained in the event. Sometimes multiple streams can be joined to correlate event streams or detect patterns in the arrival of events. However, a CEP engine running in a single node will not have the processing resources to handle such large volumes.

As disclosed herein, example embodiments deploy multiple CEP engines in a cluster and deployed on a number of devices. Example embodiments distribute the workload across the cluster of CEP engines. Such an arrangement can provide a scalable system. The system can scale the cluster of CEP engines elastically so that as load increases new CEP engines can be added to the cluster dynamically without impacting the health (e.g., performance, network stability, etc.) of the cluster. The cluster can selfheal in case of an CEP engine failures or a specific instance becoming busy. Furthermore, the system can deploy the cluster across one or more datacenters. In such a scenario, event messages flow over a wide area network. In order to use the communication bandwidth efficiently, the messaging system can batch and compress the messages travelling over the network.

As used herein, events can refer to messages in a messaging system. It will be appreciated that example embodiments of the messaging system can be used in applications other than the CEP use case.

FIG. 1 is a network diagram depicting a client-server system 100, within which one example embodiment can be deployed. A networked system 102, in the example form of a network-based marketplace or publication system, provides server-side functionality, via a network 104 (e.g., the Internet or wide area network (WAN)), to one or more clients. FIG. 1 illustrates, for example, a web client 106 (e.g., a browser), and a programmatic client 108 executing on respective client machines 110 and 112. Herein, the client machine 110 can be referred to as a "client device" or "user device" in various applications.

An application program interface (API) server 114 and a web server 116 are coupled to, and provide programmatic and web interfaces respectively to, one or more application servers 118. The application servers 118 host one or more marketplace applications 120, and payment applications 122. The application servers 118 are, in turn, shown to be coupled to one or more data processing servers 123 that facilitate processing data and database servers 124 that facilitate access to one or more databases 126.

The marketplace application(s) 120 can provide a number of marketplace functions and services to users that access the networked system 102. The payment application(s) 122 can likewise provide a number of payment services and functions to users. The payment application(s) 122 can allow users to accumulate value (e.g., in a commercial currency, such as the U.S. dollar, or a proprietary currency, such as "points") in accounts, and then later to redeem the accumulated value for items that are made available via the marketplace application(s) 120.

The data processing servers 123 can provide a number of functions and services to the networked system 102. In an example embodiment, the data processing servers can deploy a number of producer devices for generating event messages based on data received from the client machines 110. Furthermore, the data processing servers 123 can deploy a number of CEP engines for processing event messages generated by the producer devices. The data processing servers 123 can correspond to a number of servers deploying a distributed architecture. For example, a number of data processing servers 123 can be deployed within a number of datacenters as producer devices. Additionally or alternatively, a number of data processing servers 123 can be deployed within a number of datacenters as CEP engines. As will be described later in connection with FIG. 3, the data processing servers 123 can include additional components for facilitating routing event messages to the respective CEP engine.

Further, while the system 100 shown in FIG. 1 employs a client-server architecture, the present inventive subject matter is, of course, not limited to such an architecture, and could equally well find application in a distributed, or peer-to-peer, architecture system, for example. The various marketplace and payment applications 120, 122 could also be implemented as standalone software programs, which do not necessarily have networking capabilities.

In addition, while the various marketplace and payment applications 120, 122 have been described above as having separate functionalities, in alternative embodiments these functionalities can be performed by any one or more of the various marketplace and payment applications 120, 122.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 can, for example, be a seller application (e.g., the TURBOLISTER™ application developed by EBAY INC.™, of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server 130, as having programmatic access to the networked system 102 via the programmatic interface provided by the API server 114. For example, the third party application 128 can, utilizing information retrieved from the networked system 102, support one or more features or functions on a website hosted by the third party. The third party website can, for example, provide one or more promotional, marketplace, or payment functions that are supported by the relevant applications of the networked system 102.

Figure 2:
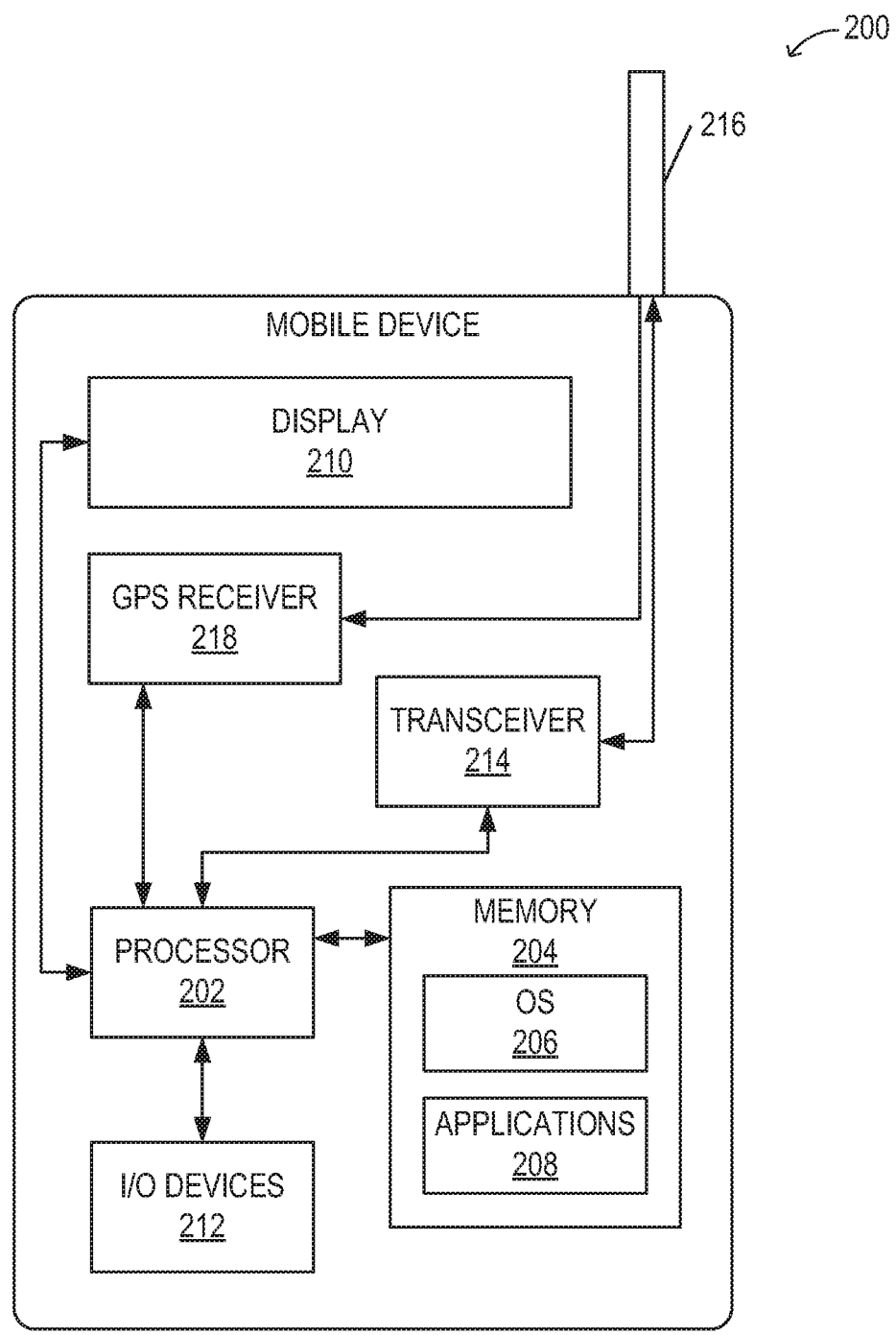
FIG. 2 is a block diagram illustrating a mobile device, according to an example embodiment.

FIG. 2 is a block diagram illustrating a mobile device 200, according to an example embodiment. In an example embodiment, the mobile device 200 can correspond to the client machine 110 of FIG. 1. In particular, the mobile device 200 can interact with the networked system based on user input received by the mobile device 200 from a user. Examples of user input can include file requests, page views, clicks, form submissions, "keypress" events, input device events, and/or other client-machine-side interactions. File requests can encompass requesting, e.g., a web page, a component of a webpage, image data, data from the marketplace application 120, and the web resources. The user input can additionally or alternatively correspond to a sequence of interactions, such a click path or stream (e.g., an ordered sequence of client-machine-side interactions).

The mobile device 200 can include a processor 202. The processor 202 can be any of a variety of different types of commercially available processors specially configured for mobile devices 200 (for example, an XScale architecture microprocessor, a microprocessor without interlocked pipeline stages (MIPS) architecture processor, or another type of processor). A memory 204, such as a random access memory (RAM), a Flash memory, or other type of memory, is typically accessible to the processor 202. The memory 204 can be adapted to store an operating system 206, as well as application programs 208, such as a mobile location-enabled application that can provide location based services (LBSs) to a user. The processor 202 can be coupled, either directly or via appropriate intermediary hardware, to a display 210 and to one or more input/output (I/O) devices 212, such as a keypad, a touch panel sensor, a microphone, and the like. Similarly, in some embodiments, the processor 202 can be coupled to a transceiver 214 that interfaces with an antenna 216. The transceiver 214 can be configured to both transmit and receive cellular network signals, wireless data signals, or other types of signals via the antenna 216, depending on the nature of the mobile device 200. Further, in some configurations, a global positioning system (GPS) receiver 218 can also make use of the antenna 216 to receive GPS signals.

Example Messaging Systems

In example embodiments disclosed herein, a messaging system utilizes a publication-subscription (also referred to as "pub-sub" herein) process by which producer devices (also referred to as "transmitter device" herein) and consumer devices (also referred to as "receiver devices" herein) connected to a network discover each other through advertisements sent by the consumer devices via a relay agent within the network. As stated, the producer devices can be embodied by the data processing servers 123 of FIG. 1. Additionally or alternatively, the producer devices can be embodied by the client machine 110 of FIG. 1. The consumer devices correspond to one or more servers of the data processing servers 123. A consumer device hosts one or more CEP engines for processing event messages produced by the producer devices. A relay agent can be a module hosted by the data processing servers 123 for interfacing producer devices and consumer devices during runtime.

For example, in operations the messaging system can identify a number of consumer devices (e.g., forming a "consumer cluster ring") available to receive and process messages on a given topic that a producer device generates. The producer device maintains a registry of the consumer devices that have been identified as having subscribed to the topic. As consumer devices are removed or added to the consumer cluster ring, the producer device updates the producer's registry.

The producer devices generate and send to consumer devices event messages (also referred to as "event data" herein) that are representative of events (e.g., representative of client-machine-side interactions). An event is a collection of tuples of information. A tuple is made up of a key, such as a set of American Standard Code for Information Interchange (ASCII) characters or other suitable string data type, and a corresponding value, such as a primitive data type. Example primitive types include integer, Booleans, floating point numbers, fixed point numbers, characters and/or strings, data range, and/or the like data types that are built-in the programming language. Events can be classified into types based on matching tuples of information of the events. An event stream is a collection of events received over time. There can be an event stream for each event type. In an example embodiment, the collection of tuples of information are representative of one or more user interactions or user events in connection with the user's interaction with a web resources, such as a web page or an Internet-connected software program executing on the user's device.

The producer device, e.g. using consistent hashing, associates a number of hash values to each of the consumer devices of the consumer cluster. The hash values can be viewed as respective consumer nodes on a circle. As such, the assignment of hash values to consumer devices partitions the identified consumer cluster to form a logical ring of consumer nodes for the given topic. In other words, each consumer device is represented by a number of consumer nodes on the logical ring.

The hash values can be assigned to a consumer device based on an identifier of the corresponding consumer device. Examples of identifiers of the consumer device include a globally unique identifier ("GUID") of the consumer device, an application identifier ("APPID"), a combination (e.g., a concatenation) of the GUID and APPID, IP address, and/or the like. The consumer device can provide the identifier to the producer device by providing the identifier within advertisement data as described in connection with FIG. 7.

The hash values can be assigned to the consumer device in a pseudo random manner using the identifier as a seed. In an example embodiment, the producer device assigns hash values to a consumer device by executing a pseudo random number generator using the identifier of the consumer device as the seed to generate a number of values. The generated values can be assigned as the hash values linked to the consumer device. Assigning hash values in a pseudo random manner can facilitate distributing the consumer nodes approximately evenly on the logical ring. Moreover, assigning hash values in a pseudo random manner can facilitate approximately even distribution while adding or removing consumer devices, for example, without reassigning hash values to the existing consumer nodes.

The assignment of hash values to consumer devices can be stored in a registry in the producer devices. During operation, the producer device can determine the mapping of a given hash value to the corresponding consumer device by using a hash function.

As described later in greater detail, in an example embodiment, each producer device publishing messages on a given topic produces the same logical ring. For example, each producer device publishing on a given topic can have the same consumer devices registering to receive event messages in the given topic. The consumer devices will provide the same identifiers to each of the producer devices. Moreover, each producer device can use same mechanism to assign hash values. As was described above, one example mechanism is to assign the hash values pseudo random manner using the identifiers as seeds. Accordingly, each producer device generates the same assignments between hash values and consumer devices.

The producer device schedules event messages to the consumer devices of the consumer cluster. For example, the producer device uses a key contained in the event message to generate a partition key to select one consumer device to receive the event message. In one example embodiment, the producer device computes a hash value of the partition key and matches the computed hash value against the hash values representing the consumer nodes of the consumer devices registered with the producer device. The producer device selects one of the consumer devices to receive the event message based on comparing the distance of the hash of the partition key to the respective consumer nodes. For example, the producer device makes the selection by "walking" around the logical ring in a direction (e.g., clockwise or anti-clockwise), starting at the point of the hash of the partition key, until the first consumer node is reached. The produce device selects the consumer device associated with the first consumer node and routes the event message to the selected consumer device for processing.

Using such an approach can provide an effective way to redistribute the workload to the consumer device in response to a consumer device failure or workload imbalance. For example, if a node fails, the producer device removes or ignores the consumer nodes associated with the failed consumer device. As stated, the distribution of the consumer nodes of the remaining consumer devices remain approximately evenly distributed when the consumer nodes of a consumer device is removed. This can be true since the event messages that would have been scheduled for the failed consumer device are redistributed to the next nearest consumer node of a function consumer device, while the routing of event messages to the remaining consumer devices remain the same. Likewise, when a consumer device becomes busy, the producer device can automatically rebalance workload to other consumers by removing the consumer nodes of the busy consumer device. Producer devices can discover slow consumer devices and send event messages addressed to the consumer device to an off-heap persistent queue to be replayed (e.g., processed) later, as will be described in greater detail later in connection with FIGS. 4 and 9. The statistics produced by the messaging system can be used to elastically scale consumer nodes in the cloud.

Accordingly, one aspect, among others, of example embodiments is that the messaging system provides a scalable infrastructure with self-healing features to facilitate complex event processing at very high volumes in, for example, a cloud environment. Furthermore, the messaging system provides that event messages with the same partition key are transmitted to the same consumer device in the cloud, thereby facilitating computing aggregates and for watching for patterns and reacting to those patterns. The messaging system can be deployed in a network cloud or other distributed computing environment, as the messaging system can batch, compress, and enable flow control. The messaging system can elastically scale consumer clusters in real time in response to changes in load and can automatically rebalance traffic in case of network congestion on computation machine failures. As such, example embodiment of the messaging system facilitates deploying the messaging system on a network cloud and facilitating complex event processing.

It will be understood that example embodiments of the messaging system can be used to in an Internet application tracking pipeline and several other use cases deploying, for example, the JETSTREAM CEP framework. The CEP framework can be used in building distributed applications for user behavior analytics, monitoring, advertising, internet marketing, and risk and security use cases. Example illustrative embodiments are described below.

Figure 3:
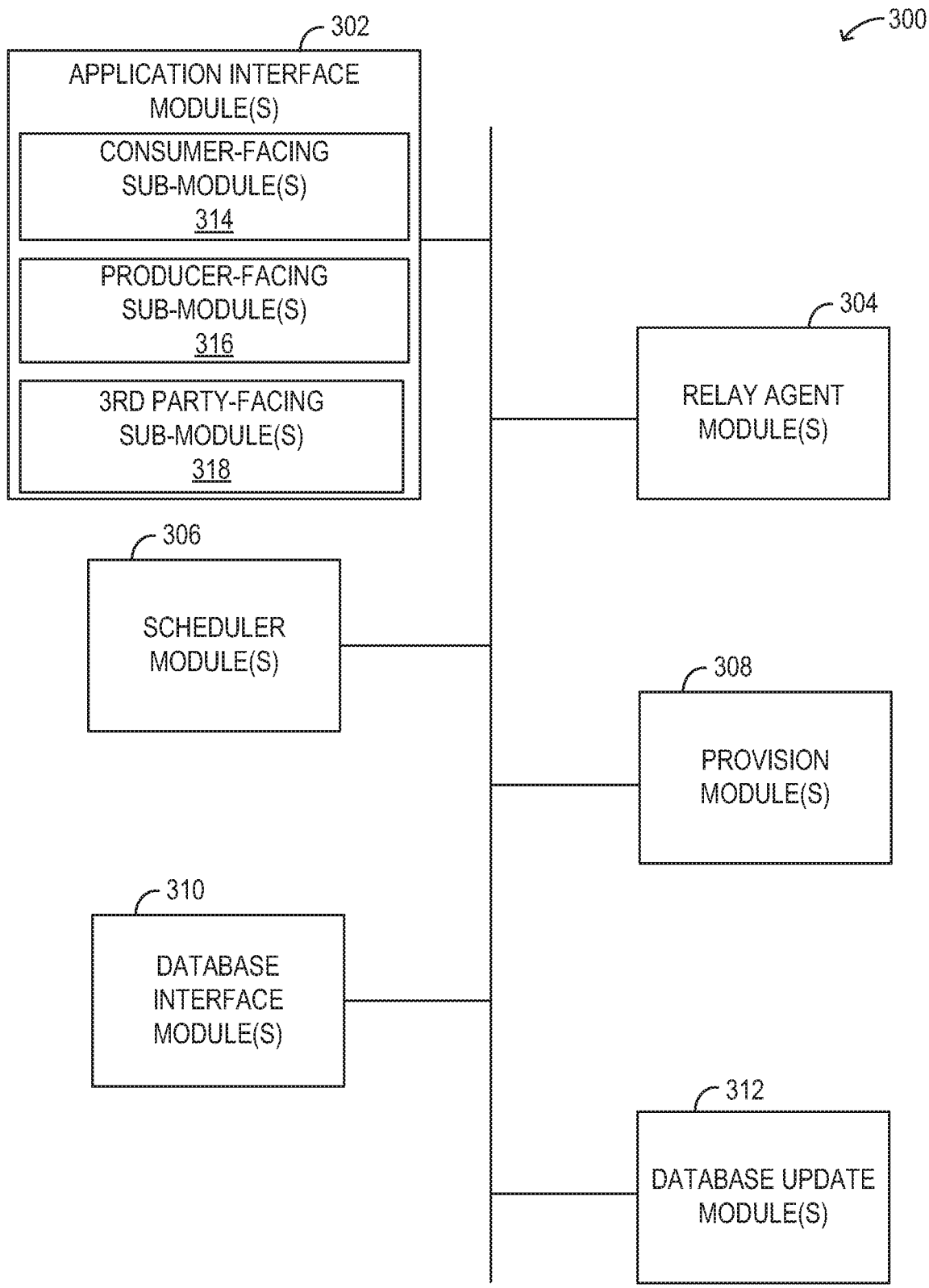
FIG. 3 is a block diagram illustrating an example embodiment of a messaging system including multiple modules forming at least a portion of the client-server system of FIG. 1.

FIG. 3 is a block diagram illustrating an example embodiment of a messaging system 300 including multiple modules forming at least a portion of the client-server system of FIG. 1. The modules 302-312 of the illustrated data analysis system 300 include an application interface module(s) 302, a relay agent module(s) 304, a scheduler module(s) 306, a provisioning module(s) 308, a database interface module(s) 310, and a database update module(s) 312. The application interface module(s) 302 includes a consumer-facing sub-module(s) 314, a producer-facing sub-module(s) 316, and a third party-facing sub-module(s) 318.

In some embodiments, the components of the data analysis system 300 can be included in the data processing servers 123 of FIG. 1. However, it will be appreciated that in alternative embodiments, one or more components of the data analysis system 300 described below can be included, additionally or alternatively, in other devices, such as one or more of the marketplace application 120, the payment application 122, the servers 114, 116, 118, 130, the network 104, and/or the client machines 110, 112 of FIG. 1. It will also be appreciated that the data analysis system 300) can be deployed in systems other than online marketplaces.

The modules 302-312 of the data analysis system 300 can be hosted on dedicated or shared server machines (not shown) that are communicatively coupled to enable communications between server machines. One or more of the modules 302-312 can be deployed in one or more datacenters. Each of the modules 302-312 are communicatively coupled (e.g., via appropriate interfaces) to each other and to various data sources, so as to allow information to be passed between the modules 302-312 of the data analysis system 300 or so as to allow the modules 302-312 to share and access common data. The various modules of the data analysis system 300 can furthermore access one or more databases 126 via the database server(s) 124.

The messaging system 300 can facilitate real-time CEP of large-scale event messages over a networked and distributed environment. To this end, the data analysis system 300 illustrated in FIG. 3 includes the relay agent module(s) 304, the scheduler module(s) 306, the provision module(s) 308, the database interface module(s) 310, and the database update module(s) 312.

The application interface module(s) 302 can be a hardware-implemented module that facilitates communication of data between the messaging system 300 and clients, server, and other devices of the network, such between the data processing servers 123 and one or more of the marketplace application 120, the payment application 122, the servers 114, 116, 118, 130, the network 104, and/or the client machines 110, 112 of FIG. 1. In particular, the application interface module(s) 302 includes the consumer-facing sub-module(s) 314 for providing an interface with consumer devices. The producer-facing sub-module(s) 316 provides an interface with producer devices. The third-party-facing sub-module(s) 318 provides an interface with a number of third-party servers. In example embodiments, the messaging system 300 can interface with third-party applications 128 that provide web-based services, such as, but not limited to, search services, data storage, data management, data mining, web-activity monitoring and analytics, and like services. The messaging system 300 can receive such services by interacting with, for example, the third party application 128.

In an example embodiment, the producers and consumer devices use a publication-subscription model. As such, the producer-facing sub-module(s) 314 provides an interface for producer devices (e.g., one or more servers of the data processing servers 123 of FIG. 1) to provide broadcast data for indicating topics to which the producer devices publish. The broadcast data identifies the producer device available to provide data messages linked to the topic The consumer-facing sub-module(s) 316 provides an interface for consumer devices (e.g., one or more servers of the data processing servers 123 of FIG. 1) to provide advertisement data for indicating topics to which the consumer devices request to subscribe. The advertisement data identifies that the consumer device is available to receive event messages linked to the indicated topics.

The relay agent module(s) 304 (also referred to as "identification module(s)" herein) can be a hardware-implemented module that facilitates linking producer devices and consumer devices. The relay agent module(s) can be embodied by one or more servers of the data processing servers 123 of FIG. 1. In operation, the relay agent module(s) 304 receives broadcast data from producer devices via the producer-facing sub-module 314 and advertisement data from consumer devices via the consumer facing sub-module(s) 316. Based on the received data from the producer and consumer devices, the relay agent module(s) 304 can serve to link the producer and the consumer devices that have matching topics.

The scheduler module(s) 306 can be a hardware-implemented module that facilitates distributing event messages from a producer device to the consumer devices of linked to the producer device. Example scheduling schemes include round robin and consistent hashing, among others. When a producer device provides a broadcast message to register with the relay agent module(s) 304, the scheduler module(s) 306 instantiates a scheduler instance hosted on the producer device. Each instance for a given topic can be the same, and is thus said that "the scheduler is bound to the topic."

The provisioning module(s) 308 can be a hardware-implemented module that facilitates scheduling event messages to the consumer devices in a scalable, fault-tolerant manner. The provisioning module(s) 308 links a plurality of values, such as hash values, to respective consumer devices that are linked to the topic. For example, the provisioning module(s) 308 can generate a plurality of values based on the corresponding consumer device identifier. The generating of the plurality of values can be in response to receiving respective request messages (e.g., advertisement data as will be described in greater in connection with FIG. 7). The plurality of values can be computed per topic. The provisioning module(s) 308 can include a pseudo-random number generator to generate the hash values for use with a consistent hashing scheduler.

In an example embodiment, the scheduler module(s) 308 determines the hash values linked to the respective consumer devices in a way that is independent of the producer device. In this way, the same hash values are provided to each producer device publishing on a given topic.

In operation, the scheduler module(s) 306 accesses (e.g., receives or retrieves) from the producer device an event message linked to the topic. The event message includes a key value, and the scheduler module(s) 306 provides the event message to a selected one of the consumer devices based on a comparison of the key and a plurality of values of the respective consumer devices. For example, the scheduler module(s) 306 computes a hash value of the key value and then compares the computed hash value with the hash values of the consumer devices. For example, the scheduler module(s) 306 makes the selection by "walking" around the logical ring in a direction (e.g., clockwise or anti-clockwise), starting at the point of the hash of the key value until the consumer hash value is reached, and the associated consumer device is selected.

The database interface module(s) 310 can be a hardware-implemented module that facilitates accessing data for the messaging system 300. In an example embodiment, the database interface module(s) 310 can interface with the database 126 of FIG. 1.

The database update module(s) 312 can be a hardware-implemented module that facilitates updating the databases supporting the messaging system 300. For example, the database update module(s) 312 can facilitate updating databases to aggregate data and to initiate database maintenance activities in response to lifecycle events of sessions (e.g., start and end session events).

Figure 4:
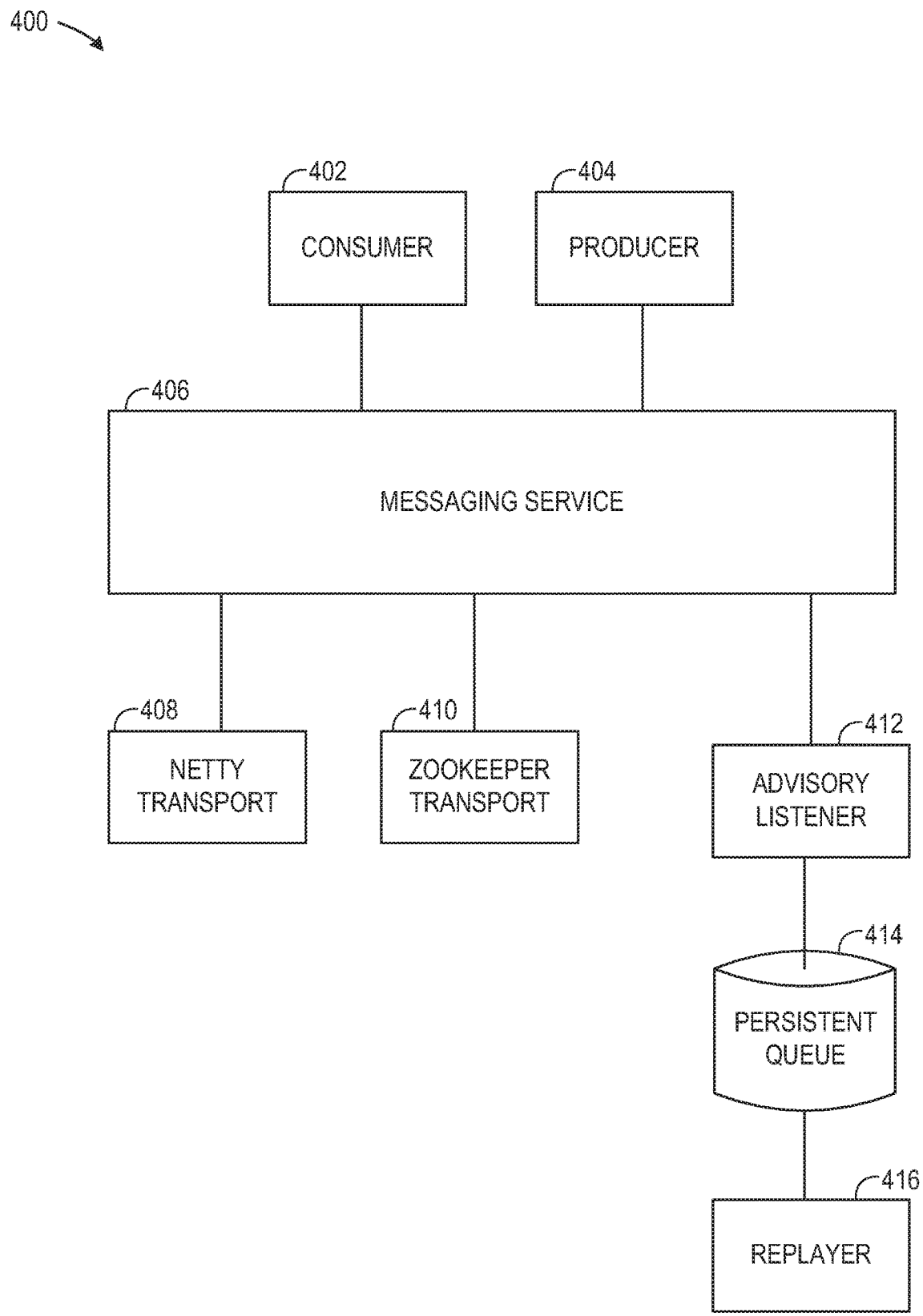
FIG. 4 is a block diagram illustrating an example producer-consumer system, in accordance with an example embodiment.

FIG. 4 is a block diagram illustrating an example producer-consumer system 400, in accordance with an example embodiment. The producer consumer system 400 includes a consumer device 402, a producer device 404, a messaging service 406, a natty transport 408, a Zookeeper transport 410, an advisory listener 412, a persistent queue 414, and a replayer 416.

As stated, the producer device 404 corresponds to a device that is a producer of event messages and can be referred to as a "publisher" in the messaging paradigm. The consumer device 402 corresponds to a device that consumes messages and can be referred to as a "subscriber" of messages.

In operation, the producer device 404 and the consumer device 402 establish a "contract" which establises a communication channel between the publisher and subscriber. The address for the channel is referred to as a topic. Topics are strings of the form "id1.kind1/id2.kind2/name." The '/' is a context seperator. A topic is made up of one or more contexts (e.g., "id1.kind1" and "id2.kind2"). Subsequently-listed topics (e.g., id2.kind2) can inherent attributes, such as quality of service characteristics, linked to the root context. The first context is called the root context. In some example embodiments, a topic can have only a root context.

As an illustrative example embodiment, an example topic can be named "topic=Rtbd.RTD/rtdEvent" that is being subscribed to and published on. For example, the producer device 404 interfaces with the messaging service 406 and invokes an API call to an example function publish (topic, event) that is implemented by the producer-facing sub-module(s) 316 of FIG. 3. Additionally, the consumer device 402 interfaces with the messaging service 406 and invokes an API call to an example function subscribe (topic). The root context in this topic is "Rtbd.RTD". It is bound to a specific Netty transport instance, such as available from the APACHE SOFTWARE FOUNDATION™, and which will be described in greater detail below. This context can be bound to a consistent hashing scheduler. Accordingly, by publishing on a topic bound to "Rtbd.RTD," the messaging service 406 uses consistent hashing scheduling.

The implementation exposes a singleton service interface that can be used by producer devices to publish messages and consumer devices to consume messages. The messaging service 406 has a plugggable transport architecture. The transport instances can be dynamically plugged into the messaging service 406 at runtime. The messaging service 406 can support at least two types of transports, such as a Netty transport 408 and a Zookeeper transport 410, such as available from the APACHE SOFTWARE FOUNDATION™.

The messaging service 406 can use the Zookeeper transport 410 to send control messages. Example control messages include discovery, advertisement, and advisory messages. The Zookeeper transport 410 can communicate with a distributed Zookeeper ensemble which acts as a relay agent to pass control messages between producer and consumer message service instances. The Zookeeper transport 410 binds to a topic and controls message flows over this topic.

The messaging service 406 can use the Netty transport 408 for transporting event messages. The Netty transport 408 can be built on top of Netty non-block input-output (NIO) facility. It provides a completely async transport over TCP. It transports plain old JAVA objects (POJOs) and uses Kryo object serializer for marshalling the JAVA objects. The messaging service 406 can deploy one or more Netty Transport instances.

In an example embodiment, each instance of the Netty Transport 408 binds to one or more root context of a topic. This binding is provisioned with the rule that no two transport instances bind to the same root context. Each root context is bound to a scheduler module. All topics bound to the context are then bound to the scheduler that is bound to the context. Each transport instance has its own communication properties, which can substantially correspond to TCP properties which can be tuned at runtime. The advisory listener 412 can direct undelivered event messages to the persistent queue 414 to be resent later by the replayer 416. Advisory listener 412 and replayer 416 will be described later in greater detail in connection with FIGS. 8-10.

Figure 5:
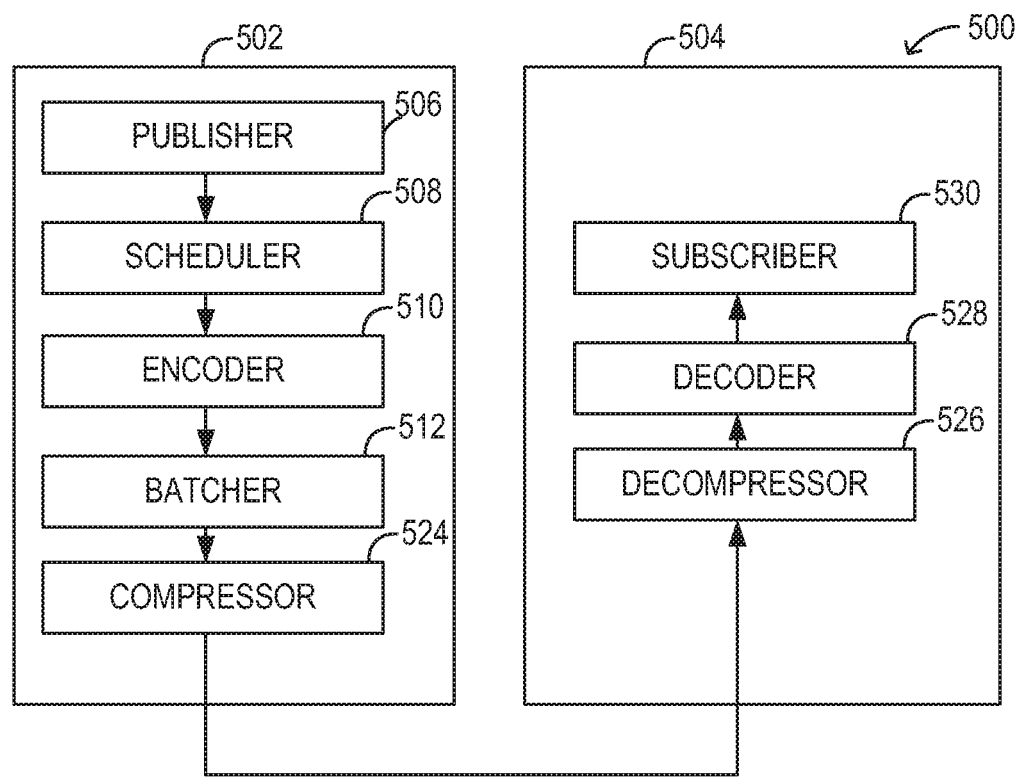
FIG. 5 is a block diagram illustrating an example messaging stack, in accordance with an example embodiment.

FIG. 5 is a block diagram illustrating an example messaging stack 500, in accordance with an example embodiment. The messaging stack 500 includes a producer-side stack 502, which includes a publisher 506, a scheduler 508, an encoder 510, a batcher 512, and a compressor 524. The messaging stack 600 also includes a consumer-side stack 504, which includes a decompressor 526, a decoder 528, and a subscriber 530.

The producer-side stack 502 can be embodied by a server of the data processing servers 123. The scheduler 508, the encoder 510, the batcher 512, and the compressor 524 can be embodied by the scheduler module(s) 306. The consumer-side stack 504 can be embodied by a server of the data processing servers 123.

The publisher 506 can correspond to a producer device 404 of FIG. 4. The publisher 506 provides the scheduler event messages to be published to one or more subscribers (e.g., consumer devices).

The scheduler 508 can correspond to the scheduler module(s) 306 of FIG. 3. The producer-side of the messaging stack is provisioned with the pluggable message scheduler 508. The scheduler 508 can be one of two types: weighted round robin or consistent hashing scheduling algorithms. Schedulers provide quality of service (QOS). The scheduler 508 is bound to a root context of a topic in example embodiments. Accordingly, the publisher can pick QOS by simply picking the topic bound to the root context.

Weighted Round Robin:

When the weighted round robin scheduler is provisioned, event messages are distributed amongst the discovered consumers using a weighted round robin algorithm. With this approach if weights for all consumers are same, then the messages flowing down the producer side stack are equally distributed amongst the set of consumers bound to that root context. If a weight is assigned to a consumer node then events are distributed to that node taking the weight into account. For example, if the weight is set to 20 for a specific consumer instance, then only 20% of overall messages per second (MPS) is scheduled to that instance and the balance gets equally distributed between the remaining of the instances. Workload distribution can be done per topic.

Consistent Hashing:

When a consistent hashing scheduler is provisioned, a consistent hashing ring is created per topic. For example, when a consumer advertisement arrives, a provisioned number of hashes are computed using the identifier of the consumer device. For example, the identifier can be contained in the advertisement. This operation is performed for all discovered consumers. The hashes are distributed across a logical ring. There is one ring for each topic. The algorithm is implemented such that the producer devices publishing on the same topic have the same view of the ring. When a message arrives at the scheduler, the message is decorated with a key that can be used to create an affinity between the message and a consuming node. The scheduler 508 computes a hash on the key, and places the hashed value on the ring. The scheduler 508 then traverses the ring in an anti-clockwise or clockwise direction until the scheduler 508 meets the first hash of a consumer node. There is a mapping of hashes to consuming devices. The scheduler 508 can perform a lookup in the registry to find the consumer device associated with the matched hash. The scheduler 508 then schedules the event message to the consumer node associated with the matched hash.

A listener (e.g., the listener 412 of FIG. 4) can be plugged into the consistent hashing scheduler so that it can listen to ring change notifications with a view of the new ring. The listener can be used in systems that are sensitive to ring changes. Examples of ring changes include adding a consumer device, removing a consumer device, redefining QOS definitions of the consumer devices, and/or the like. Listeners will be described in greater detail later in connection with FIG. 9.

The encoder 510 performs an encoding process on the event message. For example, the encoder 510 receives event messages from the scheduler 508, encodes the received event messages, and provides the encoded event messages to the batcher 512.

The producer-side 502 can be provisioned with the batcher 512 to batch messages per context. Topics under the selected context can be batched. The batch size is also provisioned and this can be changed at runtime. The batcher 512 in the stack accumulates event messages delivered from upstream Event messages are scheduled downstream when either the batch size is reached or a timer expires. The timer provides a mechanism to inhibit substantial delays by the batcher 512 caused by a low rate of received event messages. It will be appreciated that the batcher 512 can be omitted in alternative embodiments. In an example embodiment, whether or not the batcher 512 is included can be determined during provisioning of the.

The compressor 524 can compress the event messages. Compression is driven through advertisements from the consumer (e.g., the subscriber 530). When the consumer signals to the producer that it expects the messages in a compressed form, the producer can compress the messages. Both batched and non-batched event messages can be compressed. In one example, SNAPPY compression is supported.

On the consumer-side of the stack 504, the decompressor 526 and the decoder 528 reverses the process of the compressor 526 and the encoder 510.

Figure 6:
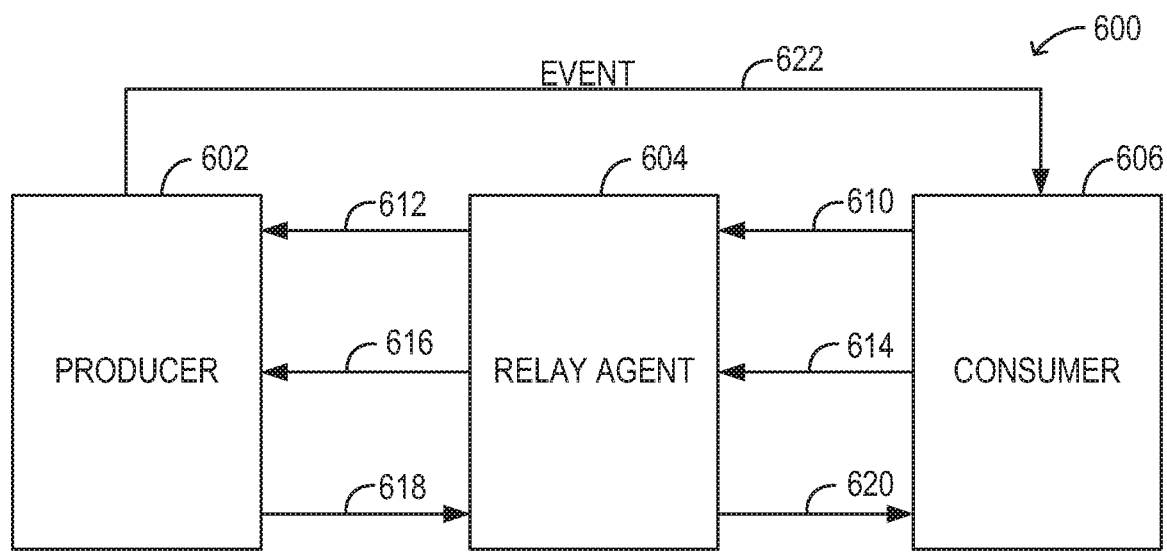
FIG. 6 is a block diagram illustrating an example producer-agent-consumer system, in accordance with an example embodiment.

FIG. 6 is a block diagram illustrating an example producer-agent-consumer system 600, in accordance with an example embodiment. The producer-agent-consumer system 600 includes a producer device 600, a relay agent module(s) 604, and a consumer device 606. FIG. 6 shows the interactions of the producer device 602, the relay agent module(s) 604, and the consumer device 606 during the publication-subscription process, and for the sake of brevity additional components of the messing system architecture are not shown. An example embodiment of the messaging system architecture is described in greater detail in connection with FIG. 8.

In operation, the producer device 602 and consumer device 606 can start up out of order. Both the producer device 602 and the consumer device 606 register with the relay agent module(s) 604. The relay agent module(s) 604 can be deployed as a cluster across datacenters. A group of the relay agents (not shown) can be configured to be an active ensemble. The remainder of the group is designated as observers. The relay agent module(s) 604 can be used as a message router/distributor. The producer devices and consumer devices publish messages through the relay agent module(s) 604 using a topic based address as previously described.

If a consumer device 606 initiates registration, the consumer device 606 posts an advertisement through the relay agent module(s) 604 to all interested producers at interaction 610. The relay agent module(s) 604, in response, posts the advertisement with the producer device 602 at interaction 612. In response, the producer device 602 can build a registry containing all known consumer devices that has registered with the producer device 602.

In some embodiments, the consumer device 606 can provide to the producer 602 a number of advisors through the relay agent module(s) 604. For example, the consumer device 606 can provide advisories to indicate a state of the consumer device 606, such as the consumer device 606 is processing event messages slowly, lacks resources to process event messages, has a surplus of resources for its current workload, is requesting reinstating workload, and/or like conditions that indicate reducing or increasing the workload to the consumer device.

As an illustration, in operation the consumer device 606 can provide the relay agent module(s) 604 the advisory message at interaction 614. The advisory message can include a consumer device identifier, a topic identifier, and an advisory identifier that is indicative of the type of advisory (e.g., usable by the producer device 602 and/or the relay agent module(s) 604 to determine to increase or decrease workload). After receiving the advisory message, the relay agent module(s) 604 can route the advisory message to the producer device 602 and other producer devices linked to the topic at interaction 616. In turn, the producer device 602 can update its registry of consumer identifiers based on the advisory. For example, the producer device 602 can remove or disable the consumer identifier from its registry so that the consumer device 606 is no longer available to receive event messages for processing.

In further operation, if the consumer device detects that the consumer device is available to process event messages, the consumer device 606 can send another advisory to the relay agent module(s) 604 to indicate to the produce device 602 that the consumer device 606 is available for receiving event messages.

When a producer device 602 initiates registration, the producer device 602 sends out a discover message through the relay agent module(s) 604 at interaction 618. The discovery message is broadcasted to all interested consumer devices, such as consumer device 606, at interaction 620. The consumer device 606, in response to receiving the discover message, can respond with an advertisement, such as was described above in connection with interactions 610, 612. The advertisement message is also sent through the relay agent module(s) 604.

Figure 7:
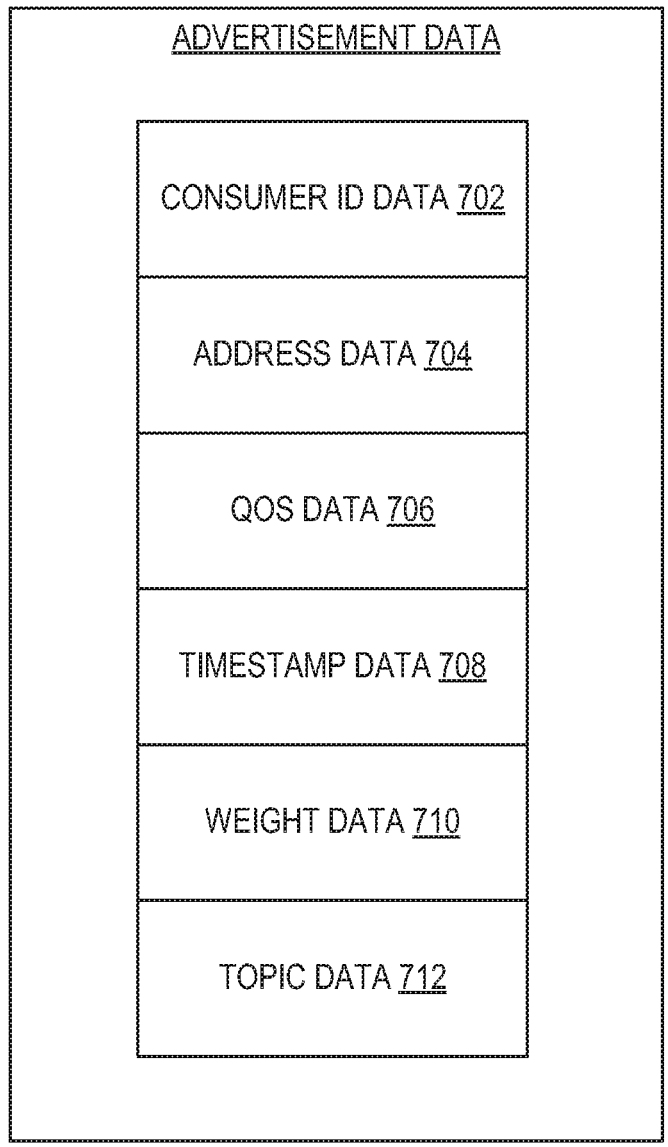
FIG. 7 is a block diagram illustrating an example data structure of an advertisement, in accordance with an example embodiment.

FIG. 7 is a block diagram illustrating an example data structure of an advertisement 700, in accordance with an example embodiment. The advertisement 700 travels from consumer device to producer device, as described above in connection with FIG. 6. The consumer device generates a unique consumer identifier data field 702 when it starts up. The advertisement 700 comprises an address data field 704, which can correspond to the consumers IP address and/or port binding. The advertisement 700 also includes a QOS data field 706 that can be indicative of any suitable quality of service characteristic, such as compression, serialization format, data rate, and the like. The advertisement 700 can also include a timestamp data field 708 that is indicative of when the consumer device posted the advertisement 700. The advertisement 700 can also include, a weight data field 710 that is indicative of a relative workload requested by the consumer device. The advertisement 700 can also include a topic data field 712 that is indicative of the topics to which the consumer device subscribing. When producer device receives the advertisement, the producer device can update its consumer registry with the advertisement 700.

Figure 8:
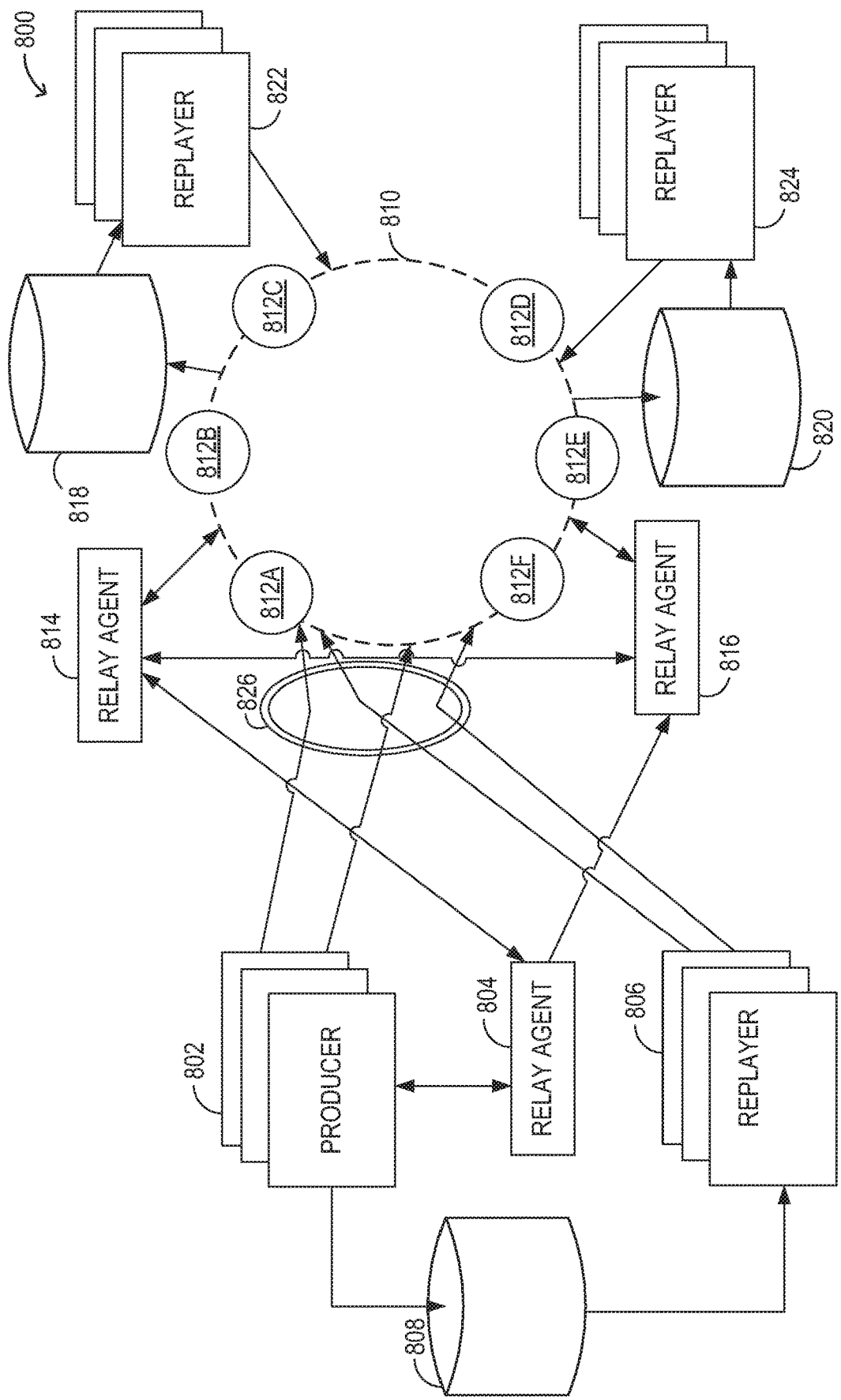
FIG. 8 is a block diagram illustrating an example messaging system architecture, in accordance with an example embodiment.

FIG. 8 is a block diagram illustrating an example messaging system architecture 802, in accordance with an example embodiment. The messaging system architecture 802 can be deployed across datacenters. For example, a first datacenter can include a producer device 802, a relay agent module(s) 804, a replayer 806, and a queue 808, such as a Kafka queue. A second datacenter can include a portion of a cluster ring 810 comprising the consumer devices 812A-C, a relay agent module(s) 814, a queue 818, such as a Kafka queue, and a replayer 822. A third datacenter can include the remaining portion of the cluster ring 810 comprising the consumer devices 812D-F, the relay agent module(s) 816, a queue 820, such as a Kafka queue, and a replayer 824. The producer device 802 passes event messages to the cluster ring 810 through a scheduler module(s) 826 that determines the routing of the event messages within the cluster ring 810. Similarly, the replayer 806 provides event messages to the cluster ring 810 through the scheduler module(s) 826.

The relay agent 804, 814, 816 correspond to instances of the relay agent module(s) 304 of FIG. 3. The scheduler module(s) 826 can correspond to the scheduler module(s) 306 of FIG. 3.

The relay agent modules 804, 814, 816 are deployed across the datacenters. Some of the relay agent modules in one of the datacenters are designated as active ensemble (e.g., relay agent modules 804, 814, 816) and the remaining as observers (not shown). The messaging stack in the producing device 802 and consuming devices 812A-F register with an available relay agent module. From then on, the producing device 802 and consuming devices 812A-F communicate with the same relay agent module until the connection is broken to that relay agent.

The producer device 802 sends discovery messages through its relay agent 804, and the consumer devices 812A-F send advertisement messages through their relay agents 814, 816. A discovery message can include a topic identifier and an identifier of the producer device 802. The discovery and advertisement messages can be sent and received across datacenters. Accordingly, producer devices can discover consumer devices across datacenters. Furthermore, the scheduler module(s) 826, utilizing a consistent hashing arrangement, can facilitate routing event messages to cluster ring 810 having consumer devices that span across multiple datacenters.

Figure 9:
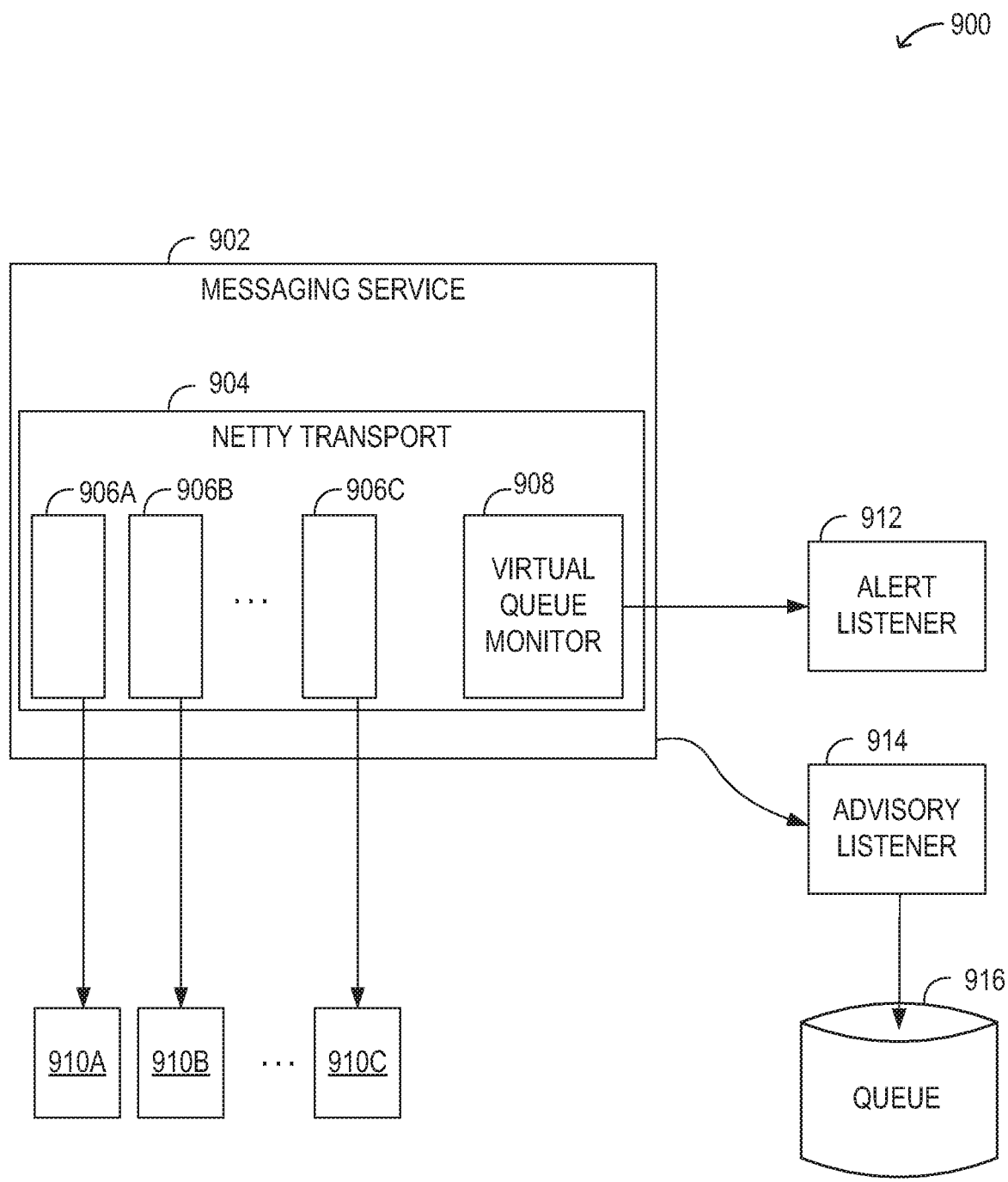
FIG. 9 is a block diagram illustrating an example monitoring system deployed by the messaging system, in accordance with an example embodiment.

FIG. 9 is a block diagram illustrating an example monitoring system 900 deployed by the messaging system, in accordance with an example embodiment. The monitoring system 900 includes a messaging service 902, which includes a Netty transport 904 containing virtual queues 906A-C and a virtual queue monitor 908. The messaging service 902 interfaces with one or more consumer devices 910A-C, an alert listener 912, and an advisory listener 914 connected to a queue 916.

In one aspect, the monitoring system 900 can support self-healing clusters. For example, when a consumer device 910A-C fails or becomes busy, the traffic being scheduled to that consumer device should be redirected to another consumer device. This reconfiguration can be achieved through the messaging system described herein. In particular, the producer side of the messaging stack can sense when a consumer device has failed. In such a scenario, the failed consumer device can be removed from the producer device's registry and no more traffic is scheduled to that failed consumer device. Instead, the traffic is rebalanced across the other instances in the cluster ring which are still operational.

The producer side of the messaging stack maintains a virtual queue 906A-C per consumer device 910A-C in its registry, as shown in FIG. 9. The virtual queue monitor 908 monitors the virtual queues 906A-C to detect slowness of the consumer devices 910A-C. This typically happens when the network between the producer device and a consumer device becomes slow or when a consumer device operates slowly and cannot empty its communication socket buffers. In such a case, the messaging service 902 emits advisory messages to the advisory listener 914 or other listener components that are subscribing to advisory messages. The advisory message contains the original message with the topic over which it was published. The advisory listener 914 takes the event message, adds metadata and pushes the event to a Kafka queue 916. A replayer device, such as the replayers 822, 824 of FIG. 8, is setup to listen to the queue 916 and replay the message directly to the consumer device.

The producer side can also be provisioned with the alert listener 912. When the virtual queue monitor 908 detects a slow consumer device, the virtual queue monitor 908 will signal the alert listener 912. For example, the virtual queue monitor 908 can provide the alert listener 912 information about the network address of the slow consumer device along with the topic. This can be used as a signal to detect that corresponding producer device. An example method of reconfiguring a consumer cluster ring is described below in connection with FIG. 10.

Example Methods of Messaging Systems

Figure 10:
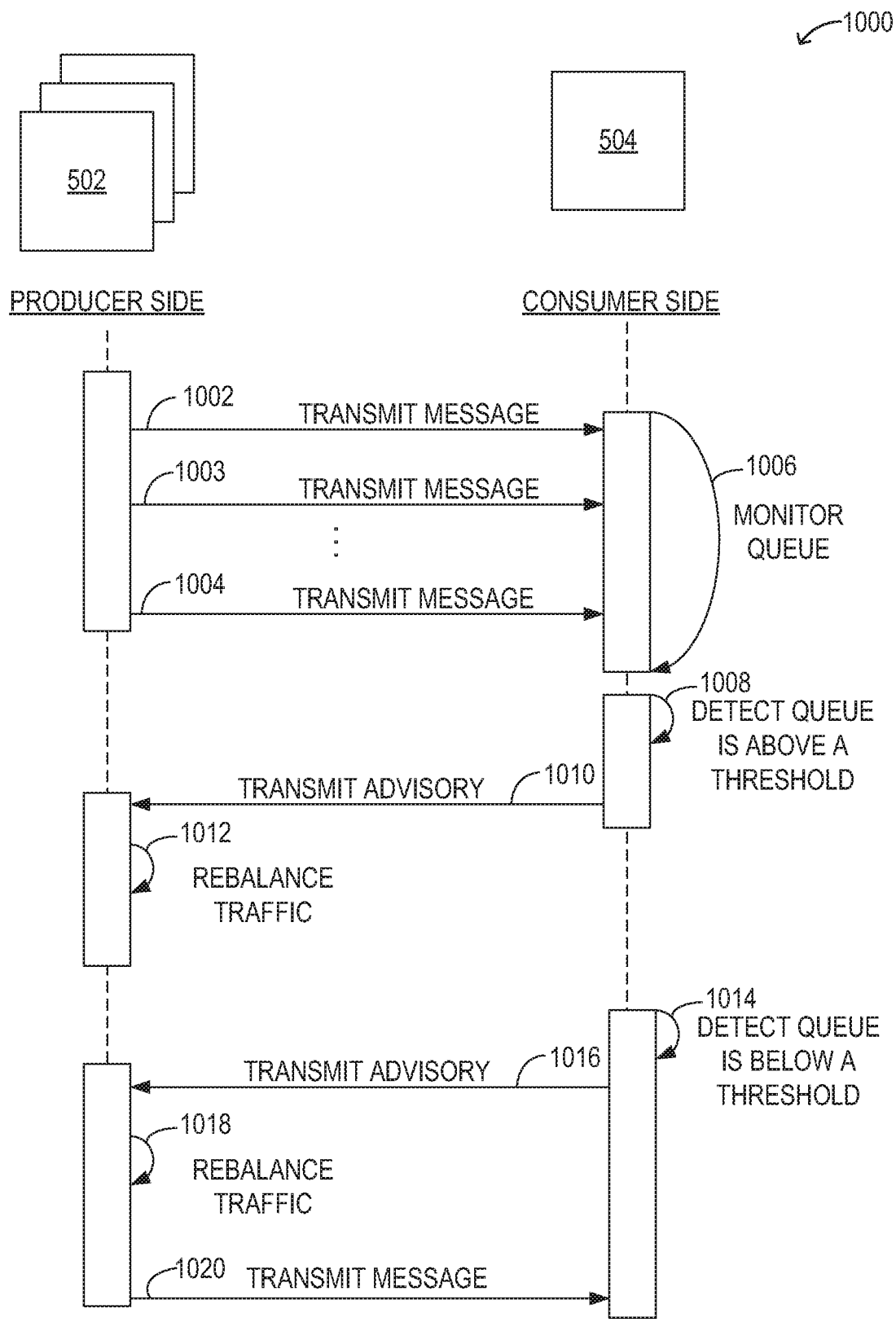
FIG. 10 is a schematic diagram depicting an example embodiment of interactions of producers and consumers for reconfiguring a consumer cluster, according to an example embodiment.

FIG. 10 is a schematic diagram depicting an example embodiment of interactions 1000 of producers and consumers for reconfiguring a consumer cluster, according to an example embodiment.

At interaction lines 1002-1004, the producer-side stack 502 transmits event messages to the consumer-side stack 504. At interaction line 1006, the consumer-side stack 504 monitors upstream queue depth to detect slowness of the consumer application. At interaction line 1008, the consumer-side stack 504 senses that the upstream queue in the consumer messaging stack has built up beyond a first threshold value, and at interaction line 1010 it sends advisories to all producer devices to stop sending messages to the consumer side stack 504. At interaction line 1012, the producer-side stack 502 reacts to the advisory message by rebalancing traffic destined to this consumer instance and distributing this traffic across the cluster ring.

At interaction line 1014, the consumer-side stack 504 detects that the upstream queue has dropped below a second threshold value, and the consumer-side stack 504 sends another advisory message to producers to start sending messages to the consumer-side stack 504 again. In an example embodiment, the first and second threshold values can be different values. At interaction line 1020, the producer-side stack 502 resumes transmission of the event messages to the consumer-side stack 504.

Figure 11:
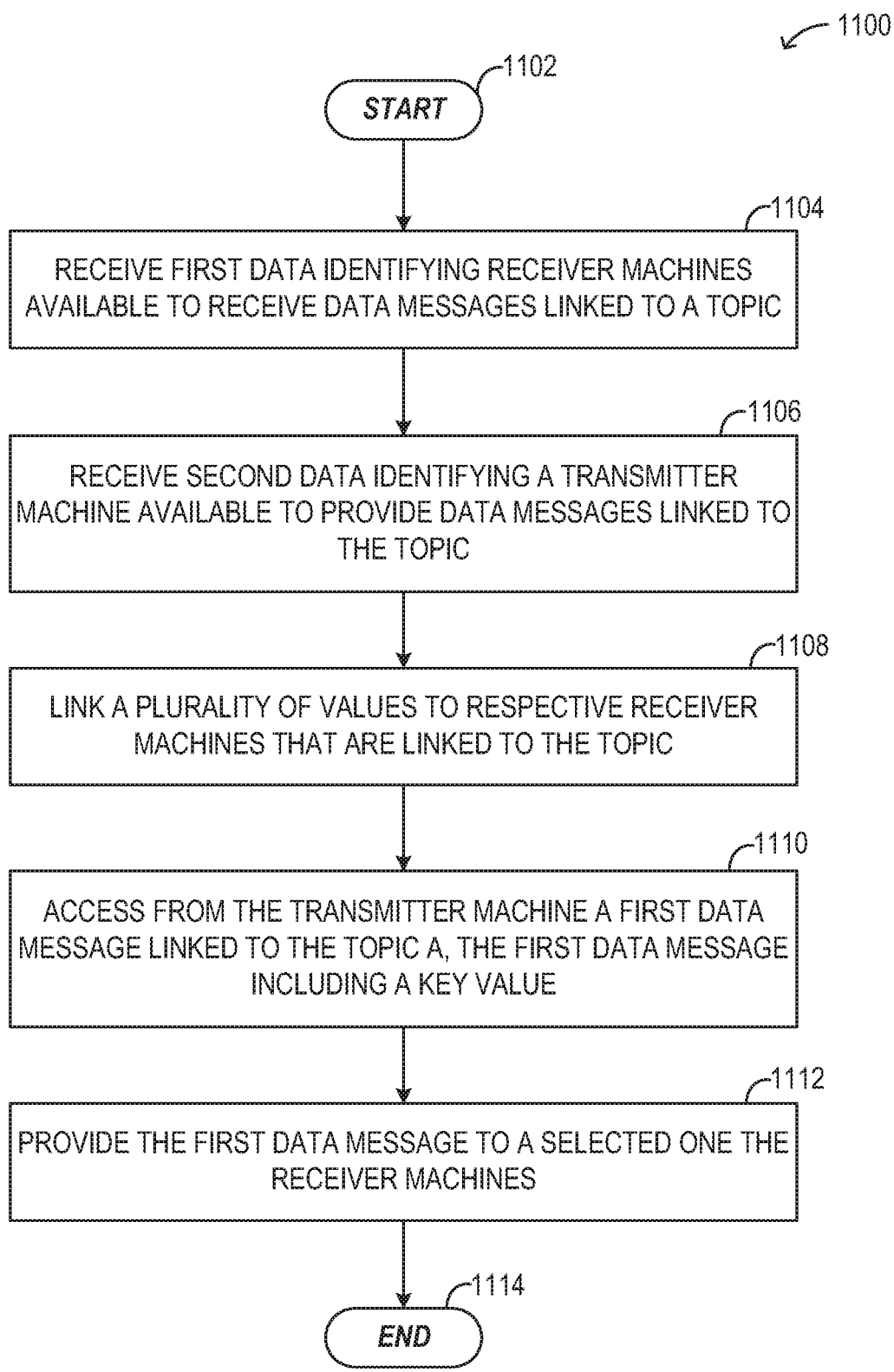
FIG. 11 is a flowchart illustrating an example method of cluster messaging, in accordance with an example embodiment.

FIG. 11 is a flowchart illustrating an example method 1100 of cluster messaging, in accordance with an example embodiment. In this example, the method 1100 can include operations such as receive first data identifying consumer devices available to receive data messages (block 1104), receive second data identifying a transmitter machine available to provide data messages (block 1106), link a plurality of values to respective consumer devices (block 1108), access from the transmitter machine a first data message (block 1110), and provide the first data message to a selected one the consumer devices (block 1112). The example method 1100 will be described below, by way of explanation, as being performed by certain modules. It will be appreciated, however, that the operations of the example method 1100 can be performed in any suitable order by any number of the modules shown in FIG. 3.

In an example embodiment, the method 1100 starts at block 1102 and proceeds to block 1104, at which the relay agent module(s) 304 receives first data identifying consumer devices available to receive data messages linked to a topic. The first data can correspond to one or more advertisements sent by consumer devices.

At block 1106, the relay agent module(s) 304 receives second data identifying a producer device (or "transmitter device") that is available to provide data messages linked to the topic. For example, the relay agent module(s) 304 can receive a discovery message from a producer device that indicates that producer device is publishing event messages on an identified topic.

At block 1108, the provisioning module(s) 308 links a plurality of values to respective consumer devices. For example, the values can be hash values generated by a consistent hashing scheduler. For example, an identifier of a consumer device can be used as a seed in a pseudo-random number generator to generate a number of values that will be assigned to the consumer device as its hash values. Thus, a number of hash values can be linked to each consumer device. The plurality of values can be computed for the topic.

At block 1110, the scheduler module(s) 306 can access from the producer device a first event message linked to the topic. For example, the scheduler module(s) 306 can retrieve the first event message from data memory (e.g., when implemented in the producer device) or receive it via a data communication channel from the producer device (e.g., when implemented in a device external to the producer device). The first event message includes a key value. At block 1112, the scheduler module(s) 306 provides the first event message to a selected one of the consumer devices based on a comparison of the key and the plurality of values of the respective consumer devices. As stated, the comparison can include evaluating the key using a hash function and then comparing the resulting hash value with the values linked to the consumer devices. The comparison can be made on the perimeter of a logical ring finding the closest match in a clockwise or anti-clockwise direction. At block 1114, the method 1100 can end.

Example Sessionization Systems

In one aspect, among others, example embodiments disclosed herein provide a system for facilitating sessionization of network data, such as for real-time analytics of Internet and mobile applications, and also for monitoring, security, Internet bot detection, and the like applications. Sessionization is a process of grouping events containing a specific identifier and that occur during a time window referred to as session duration. A visit or session is defined as a series of page requests, image requests, and/or the like web resource requests from the same uniquely identified client. Each time window starts when an event is first detected with the unique identifier. The time window terminates when no events have arrived with that specific identifier for the specified duration. For analytics of web applications, sessionization can define the session duration as 30 minutes of inactivity. However, for analytics of mobile device flows and other applications, sessionization can use different session duration.

Sessionization facilitates storing selected fields extracted from the event stream and also computing and storing aggregated counts of fields or events over the lifetime of the session as events flow through the network. Example embodiments disclosed herein are described in the context of sessionizing user behavior data. It will be appreciated that machine behavior can be sessionized in alternative embodiments, as well as other types of data suitable sessionization.

The sessionizing system described herein comprise multi-stage distributed-stages pipelined together. The first stage is a collection tier which ingests events over multiple interfaces from different sources. The sessionizer tier is the second stage of the pipeline. The sessionizer tier includes, among other components, a sessionizer bank of one or more CEP engines. Herein, the sessionizer bank will also be referred to a "cluster ring," but it will be appreciated that the CEP engines of the cluster ring need not be arranged physically in a circle or other particular geometric pattern.

In one aspect, among others, the sessionizer system creates and sustains sessionized data per tenant (or referred to as "subscriber") and produces lifecycle events as the session transitions through its start and end state. A tenant is a client device requesting sessionized data.

To achieve a fault-tolerant distributed environment operating across multiple datacenters, the sessionizing system uses the messaging system 300 of FIG. 3 to maintain and manipulate the state of a session. Furthermore, the sessionization system can create hierarchical sessions where one session spans multiple sub sessions and/or multiple channels.

Figure 12:
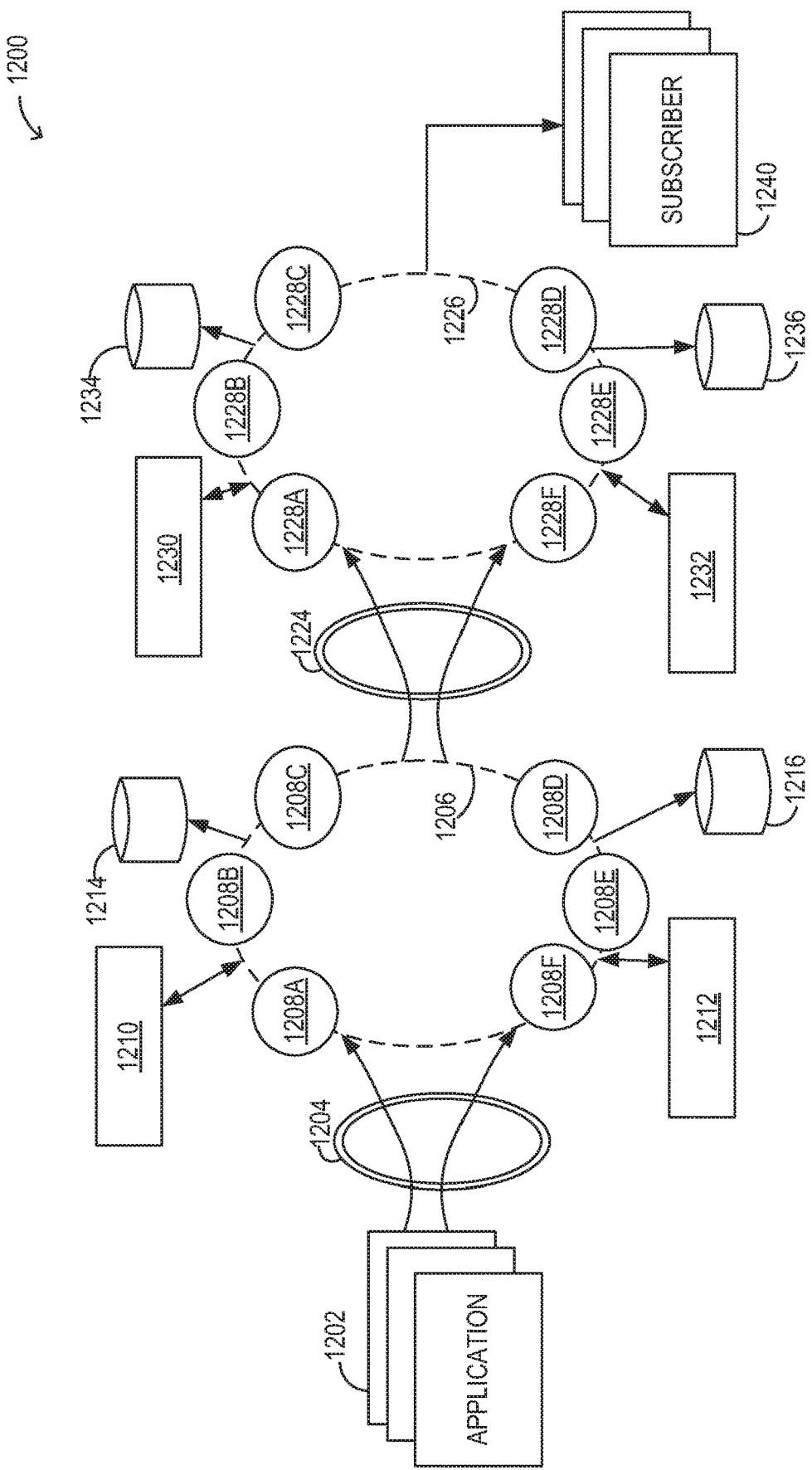
FIG. 12 is a block diagram illustrating an example sessionizer system architecture, in accordance with an example embodiment.

FIG. 12 is a block diagram illustrating an example sessionizer system architecture 1200, in accordance with an example embodiment. The sessionizer system architecture 1200 includes an application(s) 1202 that transmits event messages by a first messaging system 1204 to a collector cluster ring 1206 that includes one or more CEP engines 1208A-F. The collector cluster ring 1206 is interconnected with Zookeeper transports 1210, 1212 and queues 1214, 1216. Additionally, the collector cluster ring 1206 connected to a second messaging system 1224 that routes and passes event messages to a sessionization cluster ring 1226 formed by one or more consumer devices 1228A-F. Additionally, the sessionization cluster ring 1226 is interconnected with Zookeeper transports 1230, 1232 and data queues 1234, 1236. Furthermore, the sessionization clustering 1226 can be interconnected with a subscriber(s) 1240.

The application(s) 1202 can correspond to web resources executed on user devices and can serve as producer devices for the collector cluster ring 1206. The messaging system 1204 can route event messages from the application(s) 1202 to the collector cluster ring 1206 using a round-robin scheduler module. Event messages are then routed by the second messaging system 1224 to the sessionization cluster ring 1226 for processing to generate sessionized data. The sessionization clustering 1226 provides the sessionized data to a corresponding subscriber(s) 1240, which is a device(s) that requests particular sessionized data.

The collector cluster ring 1206, the CEP engines 1208A-F, the Zookeeper transports 1210, 1212 and the queues 1214, 1216 for a first tier of the sessionizer system 1200 can be referred to as the collector tier. The collector tier can be deployed using multiple datacenters. For example, a first datacenter can deploy the CEP engines 1208A-C, the Zookeeper transport 1210, and the data queue 1214. A second datacenter can deploy the CEP engines 1208D-F, the Zookeeper transport 1212, and the data queue 1216.

The collector tier receives event messages over multiple interfaces from different 1202 sources, such as the application(s) 1202, and schedules the event messages to a second tier, referred to as the sessionizer tier, through the second messaging system 1224. Accordingly, the CEP engines 1208A-F serve as consumer devices with respect to the application(s) 1202 and serve as producer devices with respect to the sessionization tier 1226. In an example embodiment, the second messaging system 1224 can correspond to the messaging system 300 of FIG. 3.

The sessionizer tier comprises the sessionization cluster ring 1226, the consumer devices 1228A-F, the Zookeeper transports 1230, 1232, and the data queues 1234, 1236. As such, the sessionizer tier can deployed as a cluster ring that encompasses multiple datacenters. For example, the first datacenter can deploy the consumer devices 1228A-C, the Zookeeper transport 1230, and the data queue 1234, and a second datacenter can deploy the consumer devices 1228D-F, the Zookeeper transport 1232, and the data queue 1236. To provide messaging across multiple datacenters, the Zookeepers 1210, 1212, 1230, 1232 can embody the relay agent module(s) 304.

The subscriber(s) 1240 provides to the sessionization cluster ring 1226 a request message to receive sessionized data. The subscriber(s) can be referred to as a "tenant." The sessionization cluster ring 1226 performs sessionization on a per-tenant basis. In other words, the sessionization cluster ring 1226 can generate sessionized data specifically for a particular tenant.

Accordingly, each tenant-specific session has a unique identifier derived from one or more tuples in the event stream. The collector tier and the second messaging system 1224 can partition the sessionization cluster ring 1226 based on a key included in the event messages. For example, the key can correspond to a globally unique identifier ("GUID") of the event messages. A GUID is unique to the device that is the source of the event messages (e.g., the user device browsing a website). It will be appreciated that other data of the event messages can be used as the key in alternative example embodiments. For example, an application identifier ("APPID") and the GUID can be combined (e.g., concatenated or joined) to form the session identifier.

As stated, the collector tier can receive event messages over multiple interfaces. In an example embodiment, the collector tier additionally normalizes the received event messages prior to sending the event message downstream. The CEP engines 1208A-F hosted in the collector tier can filter out Internet bot traffic. For example, the CEP engines 1208A-F can look up Internet bot signature (e.g., patterns of events) and mark the event messages that match an Internet bot signature as a "BOTSignatureEvent" type. The event message can be marked by adding metadata indication the "BOTSignatureEvent" type. After filtering, the event message stream is then scheduled for the sessionizer tier by using the key within the event message, such as by using the GUID of the event message, as will be described in greater detail in connection with FIG. 14.

The sessionizing system can facilitate tenants defining the session duration specific to their sessions. For example, session duration can defined as 30 minutes of inactivity. In alternative examples, session duration can be shorter (e.g., 5-10 minutes) or longer (e.g., 30-60 minutes).

Figure 13:
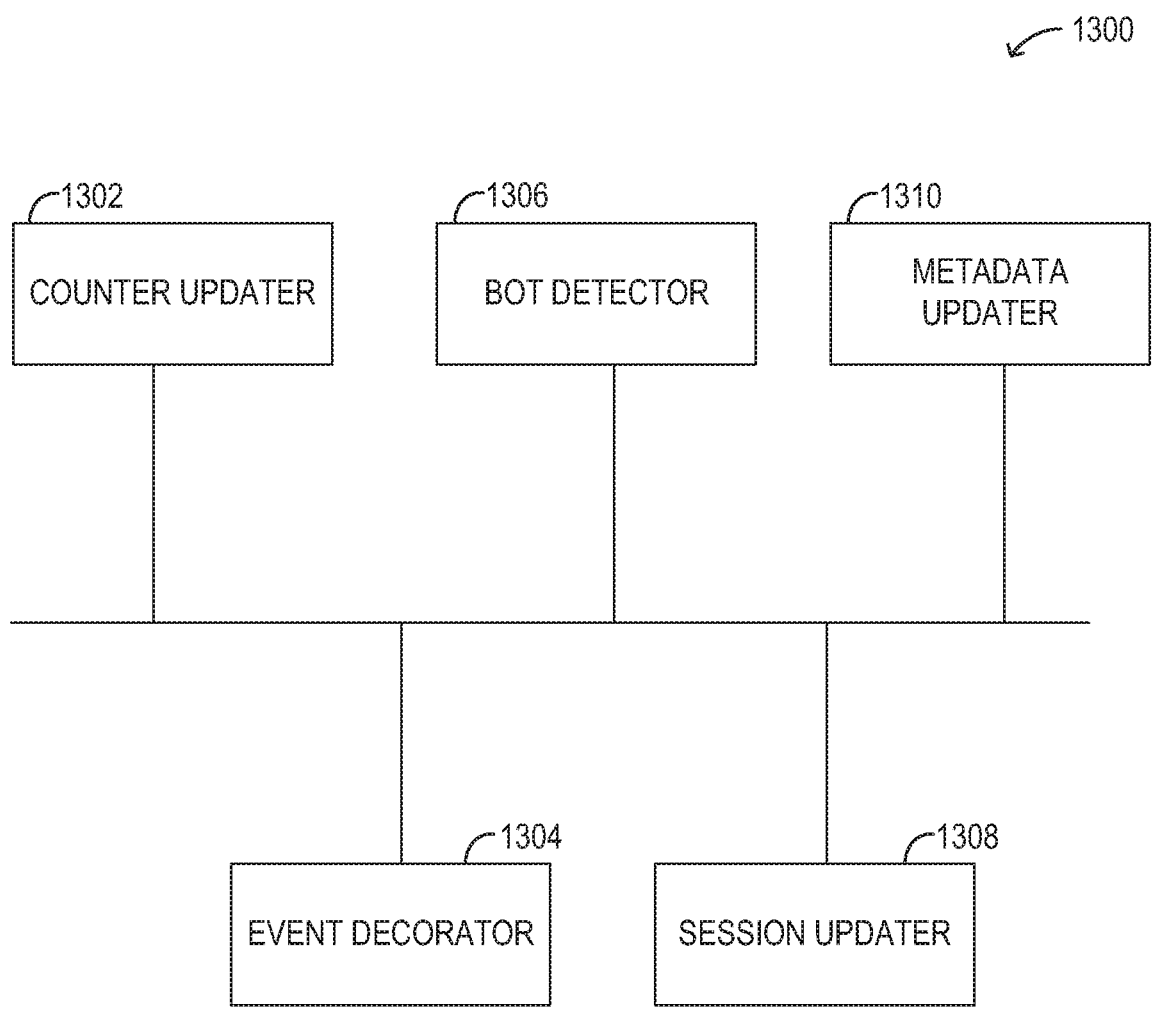
FIG. 13 is a block diagram illustrating example embodiment of a sessionizer including multiple modules.

FIG. 13 is a block diagram illustrating example embodiment of a sessionizer system 1300 including multiple modules. The illustrated sessionizer system 1300 includes a counter updater module(s) 1302, an event decorator module(s) 1304, a bot detector module(s) 1306, a session updater module(s) 1308, and a metadata updater module(s) 1310.

In some embodiments, the components of the sessionizer system 1300 can be included in the data processing servers 123 of FIG. 1 and/or the cluster ring 1226 of the sessionizer ring. However, it will be appreciated that in alternative embodiments, one or more components of the sessionizer system 1300 described below can be included, additionally or alternatively, in other devices, such as one or more of the marketplace application 120, the payment application 122, the servers 114, 116, 118, 130, the network 104, and/or the client machines 110, 112 of FIG. 1. It will also be appreciated that the sessionizer system 1300 can be deployed in other machines interconnected with the network 104 and in systems other than online marketplaces.

The modules 1302-1310 of the sessionizer system 1300 can be hosted on dedicated or shared server machines (not shown) that are communicatively coupled to enable communications between server machines. One or more of the modules 1302-1310 can be deployed in one or more datacenters. Each of the modules 1302-1310 are communicatively coupled (e.g., via appropriate interfaces) to each other and to various data sources, so as to allow information to be passed between the modules 1302-1310 of the sessionizer system 1300 or so as to allow the modules 1302-1310 to share and access common data. The various modules of the sessionizer system 1300 can furthermore access one or more databases 126 via the database server(s) 124.

The counter updater module(s) 1302 can be a hardware-implemented module that facilitates the counting of the occurrence of user-defined fields in received event messages and/or count the events represented by the event messages. In operation as event messages arrive, the counter updater module(s) 1302 maintains a count of the occurrence of user defined fields in those event messages or counts the events. These counters are maintained in session data storage.

The event decorator module(s) 1304 can be a hardware-implemented module that facilitates combining sources of information external to the event message with the event messages. For example, other sources of data with valuable information can be combined with an event stream, such as for example, a user behavior stream Examples of data that can be added with the event message data includes geographical information, device classification, demographics, and segment data.

In an example embodiment, the event decorator 1304 combines supplemental data with the event message streams in real-time as the event messages flow through the sessionizer system 1300. For example, the event decorator 1304 looks up a data store using one of the attributes of the event message as keys. Caching data can be used locally on the processing node or externally in a fast lookup cache. Adding the supplemental data to event message streams in real-time facilitates scalable data stores that can be queried at the rates experienced in large-scale systems.

The bot detection module(s) 1306 can be a hardware-implemented module that facilitates processing event messages generated by Internet bot programs.

The bot detection module(s) 1306 can identify in real-time event messages that correspond to activities of Internet bot programs. Although an application tier that is upstream of the bot detection module(s) 1306 can look up bot signatures in the producing applications (e.g., signatures of self-declared bots and those detected during offline processing can be stored in a cache for looked up), the application tier may fail to identify some Internet bot activities. The bot detection module(s) 1306 detects Internet bot program activities by observing the rates at which the Internet bot programs are accessing the site using signatures. The bot detection module(s) 1306 uses probabilistic frequency estimation techniques measured over rolling windows of time. The bot detection module(s) 1306 can serve to reduce the processing resources consumed by event messages generated by Internet bot programs. As the sessionization system 1300 detects bot signatures, the sessionization system 1300 updates the bot signature cache. This cache can be provided by the collector tier to enforce bot filtering.

The session updater module(s) 1308 can be a hardware-implemented module that facilitates updating session information. For example, the session updater module(s) 1308 can post a session start marker event to the corresponding session when a session is created and a session end marker event to the corresponding session when a session ends. The session start and end marker events contain metadata derived from event streams and geographical enriched data. The sessionizer system 1300 can support cross-channel (e.g., across multiple devices) sessions referred to as super sessions. The session identifier of a super session is the user identifier.

The metadata updater module(s) 1310 can be a hardware-implemented module that facilitates extracting data from streams of event messages. For example, the metadata updater module(s) 1310 can extract data from the event messages of a session and store the extracted data in a session record in the form of session metadata. Examples of session metadata include session identifier data, a page identifier data, geographical location data (e.g., city, region, country, continent, longitude, latitude, Internet service provider), browser type data, OS type data, and device type data.

In response to receiving a message event, the sessionizer system 1300 looks up the cache to determine if a key for the session exists. For example, the event message has metadata indicating the key to use for cache lookup. The event message is evaluated by the consumer device of the sessionization tier and, for respective tenants, metadata is extracted and updated into the respective tenant's session if the session exists (e.g., the key for the session exists in the cache). If session does not exist (e.g., the key for the session does not exist in the cache) a new session instance is created and a session key is minted and injected into the session. The metadata extracted from the event is then updated into the session record.

The sessionizer system 1300 can implement an interface for providing sessionization capabilities. In an example embodiment, the sessionizer system 1300 implements a number of annotations extending the EPL (Esper's event processing language). Example annotations are listed below:

TABLE 1

ANNOTATION LISTING

@BotSession - Hint for create/load bot session
    @BotSession("IP")
    select 'IP/' || ip as _pk_, ip
    from BotFeedbackEvent(category='IP' and ip is not null);
Create/Load a bot session and use the IP address as the bot signature.
@UpdateCounter - Increase bot session counter.
    @UpdateCounter(name="bounceCount", category="IP")
    select * from SessionEndEvent(eventCount = 1);
Increase the session counter bounceCount.
@PublishBotSignature - Detect a bot signature and publish it
    @PublishBotSignature("IP")
    select 123 as _bottype_
    from SessionEndEvent(ipSession.counter("bounceCount") > 50);
Publish the bot signature.
@DebugSession - Used for debugging
@Session -Provides hint for sessionizer to create/load session
    @Session("SOJMainSession")
    select si as _pk_, _ct as _timestamp_, _sessionTTL as _duration_
    from PULSAREvent(si is not null and _ct is not null);
The statement returns _pk_ as the identifier of the session.
The statement can also return optional _timestamp_ as the event timestamp and _duration_ as the session max inactivity time.
@SubSession - This annotation is used to provide hint for sessionizer to create/load sub session
    @SubSession("AppSession")
    select app as _pk_
    from PULSAREvent(p is not null);
The statement returns _pk_ as the identifier of the sub session and also can return an optional _duration_ as the sub session max inactivity time.
@UpdateState - Save sate to session
    @UpdateState
    select p as page from PULSAREvent;
Store the value of p tag into session variable page.
@UpdateCounter - Create/Increase session counter
    @UpdateCounter("HomePageView")
    select * from PULSAREvent(pageGroup = 'HomePage');
Increase the session counter HomePageView if the pageGroup is HomePage.
@AppendState - Append data into a list variable
    @AppendState(name="pageList ", colname="page", unique="true")
    select p as page from PULSAREvent;
Append the current page to session pageList variable.
@UpdateMetadata - Save to session metadata
    @UpdateMetadata
    select ipv4 as ip
    from PULSAREvent (session.eventCount = 1);
Store the ipv4 value into the metadata.
@UpdateDuration - Change session max idle time.
    @UpdateDuration
    select 60000 as _duration_
    from PULSAREvent (session.botEventCount = 1);
Change session duration to 1 minute if it is a BOT session
@DecorateEvent - Decorate new event info into the current event.
    @DecorateEvent
    select metadata.string('Referrer') as _Referrer
    from PULSAREvent(metadata.string('Referrer') is not null);
Decorate first event referrer to all following events.

Figure 14:
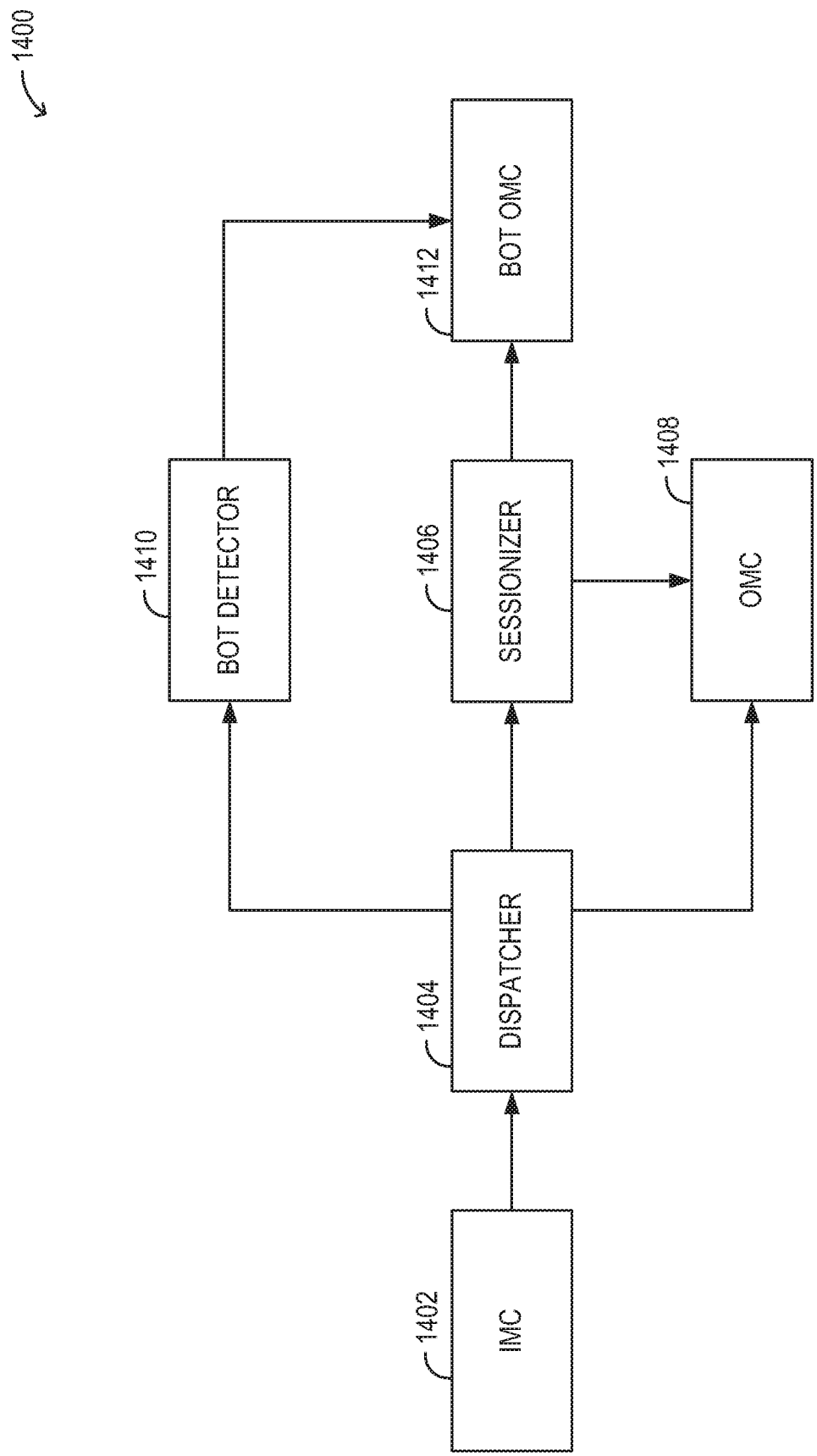
FIG. 14 is a block diagram illustrating an example sessionizer architecture, in accordance with an example embodiment.

FIG. 14 is a block diagram illustrating an example sessionizer architecture 1400, in accordance with an example embodiment. The sessionizer architecture 1400 can correspond to the sessionizer tier described above in connection with FIG. 12. The sessionizer architecture 1400 includes an inbound message channel (IMC) 1402, a dispatcher 1404, a sessionizer 1406, an outbound message channel (OMC) 1408, a bot detector 1410, and a bot OMC 1412. The sessionizer 1406 can implement the counter update module(s) 1302, the event decorator module(s) 1304, the session updater module(s) 1308, and the metadata updater module(s) 1310.

In an example embodiment, the sessionizer architecture 1400 is implemented using a JETSTREAM container. The JETSTREAM container provides a mechanism to build dynamic pipelines declaratively that can be changed at run time. The pipeline of the sessionizer architecture 1400 can be hosted in a JETSTREAM Application container and is wired as shown in the illustrated embodiment of FIG. 14.

The IMC 1402 serves as a first stage of the pipeline that receive event messages from the collector tier of FIG. 12. The event messages arriving at the IMC are then forwarded to the dispatcher 1404. In the example embodiment, the dispatcher 1404 corresponds to an Esper CEP engine that evaluates the event messages and makes routing decisions. Event messages marked as type BOTSignatureEvent are forwarded to the bot detector 1410, which processes the event message and then provides event messages to subscribers interested in receiving events which contain metrics for different bot types.

In response a determination that the received event message marked as an event type that does not require sessionization, the dispatcher 1404 forwards the received event message to the OMC 1408, thereby bypassing the sessionizer 1406.

Accordingly, the dispatcher 1404 passes to the sessionizer 1406 event messages that have bot activities filtered out. An example embodiment, the sessionizer 1406 is another CEP engine instance that manages session lifecycle and provides a fourth generation language (4GL) programmatic interface which allows extraction of data from event and update of sessions. In an example embodiment, the sessionizer 1406 is implemented using Esper's EPL. Additionally or alternatively, the sessionizer 1406 can be implementing using the annotation listed in Table 1.

Additionally or alternatively, the sessionizer 1406 creates new sessions for the specified combination of tuples of information contained in the incoming event message. The sessionizer architecture provides users an interface for writing user-defined rules for enforcing tenancy-based sessionization in structured query language (SQL). An example for achieving this using SQL is shown below:

INSERT INTO EWASESSION SELECT appid, guid, 30 AS sessionduration, *FROM TRACKING_EVENT WHERE appid is not null;
    @OutputTo("sessionizer") SELECT*FROM SESSIONINFO:

In this example, the SQL instructions define that the APPID and GUID form the session identifiers and that 30 minutes as the session duration.

Providing users the ability to define rues can be met by providing a 4GL programming construct so users can implement these rules in 4GL and submit the rules. For example, SQL can be adopted as a 4GL programming construct to implement and submit rules using POWERBUILDER™, STATISTICAL ANALYSIS SYSTEM™ (SAS), STATISTICAL PACKAGE FOR SOCIAL SCIENCES™ (SPSS), STATA™, and/or the like 4GL programs. The JETSTREAM framework, which has an embedding the JETSTREAM framework in the CEP engines, can allow the sessionizer to create new SQL rules and apply it on the fly.

In example embodiments, the sessionizer architecture 1400 can track and generate "super sessions" that span across multiple channels (for example, one session for a user using multiple screens and devices). A super session is identified by an identifier referred to as "ActorId." Events can have a unique identifier for the session referred to as a session GUID. As the user changes from one channel to another channel, the user receives multiple session identifiers (e.g., multiple GUIDs). The user's identity can be recognized during the user's interaction with the system and the ActorId is included into the event messages as an indicator of the user.

The sessionizer 1406 can detect that an event message includes an ActorId. If the sessionizer 1406 detects an ActorId in the event message, the sessionizer 1406 forwards the event message back into the sessionizer cluster ring 1226 over a different topic specifying the ActorId as the affinity key. The event is marked as being replayed to process ActorId. The sessionizer 1406 now creates a new session for the ActorId. With this approach, aggregates attributed to the channel session are now also attributed to the super session. Accordingly, if a mobile event message is received, the event message will be attributed to the mobile session and the super session. The super session can have a different life cycle compared to the sessions that are linked to it. The linked session and the super session can also have aggregates.

Additionally or alternatively, the sessionizer architecture 1400 can also partition the session itself into multiple sub-sessions. In such a case, the sessionizer architecture 1400 creates a sub-session per partition, which allows the sessionizer architecture 1400 to maintain aggregates and metadata per sub-session. The life cycle of the sub sessions is encapsulated with in the lifecycle of the parent session. So when parent session expires, the sub-sessions expire too. Aggregate and metadata updates in the sub-session can be performed in EPL. For example, subsessions can facilitate experimentation by creating subsessions for respective experiment trials as a way to measure trial results and to attribute effect of independent variables of the experiment.

Additionally or alternatively, the sessionizer architecture 1400 can track and manage session lifecycle events, such as session start and session end events. For example, when an event message arrives at the sessionizer architecture 1400, the sessionizer 1406 passes the event message through the dispatcher 1404 to determine where to forward the event message. If the event is to be sessionized, the dispatcher 1404 forwards the event message to the sessionizer processor 1406. As stated, the sessionizer 1406 is a CEP engine which has a set of rules written in SQL per tenant. The event message is evaluated by the CEP engine and, for each tenant, metadata is extracted and updated into the tenant's session if the corresponding session exists. If session does not exist, a new session instance is created and a session key is minted and injected into the session. The metadata extracted from the event is then updated into the session record. The newly created session is also updated with geographic and demographic information. A lifecycle event called "session start marker event" is generated to signal the start of a new session. This event contains session start time and all the data accumulated in the session at creation time. This event is forwarded to interested subscribers.

As more events arrive into the session, the aggregates are updated in the session. The event itself is decorated with geographic and demographic information along with the session key and sent to interested subscribers.

Session records can be stored in a cache, such as an off heap cache that can work on a very large memory region outside the JAVA heap. This cache is backed by a replicated distributed backing store deployed across multiple datacenters. The cache component has a runner that monitors the activity for each record in the cache. When a session record is updated in the cache, its last update time stamp is recorded along with an expiry time, which can be calculated in the process. The runner sweeps the entire cache every few seconds. When it encounters that a session record that has expired, it removes it from cache and generates a life cycle event called "session end marker event." This event contains the session key, the data recorded in the session along with the aggregate counts, and session start and end times.

Subscribers can subscribe to session life cycle and raw events.

Additionally or alternatively, the sessionizer architecture 1400 can facilitate dynamic scaling and fault accommodations. For example, the consumer devices 1228A-F (also referred to as "sessionizer nodes") of FIG. 12 can be automatically discovered by the CEP engines 1204 (e.g., the producer devices of the collector cluster ring 1206). The sessionizer cluster ring 1226 can grow to hundreds of nodes, and as new nodes are added to the cluster, traffic automatically rebalances. When a node in the sessionizer cluster ring 1226 fails or a new node is added to the ring, traffic is rebalanced so that all the events flowing to that particular sessionizer node is now scheduled to other nodes in the cluster ring. As traffic enters other nodes, the session state associated with that event is restored from the distributed cache.

The cluster ring facilitates disaster recovery. An event is generated in response to detecting that a change due to node failure or addition of a new node. A listener can listen to this event. The listener then queries the distributed cache for sessionizer identifiers (also referred to as "keys" herein) that were inserted from the failed node. The sessionizer identifiers that have expired (e.g., the most recent event occurred after the duration window of the session elapsed) are then processed and closed out. As part of the process of closing out the expired sessions, a life cycle event called "session end marker event" is generated.

When a new session is created a session key is minted and bound to the session, and the binding is stored in a cache. In an example embodiment, an off-heap cache technology with a distributed backing store is used. This type of design allows recovery from failures and restore state. An off-heap cache can be used that has a backing store in a server farm to store the session data.

When an event message is received, the cache is checked to see if the key exists. The event message has metadata indicating the key to use for cache lookup. If the key is not found, the backing store is checked. If the key is found in the backing store, the session is restored from cache, the count is incremented, and the backing store is updated.

When a sessionizer node dies, the session that were supposed to expire on the node should be closed. A record of these sessions are stored in the distributed cache. The sessionizer architecture 1400 maintains a segment in the cache that contains a set of keys that were written to the cache from the sessionizer nodes accumulated over a window (e.g., 200 milliseconds). In this way, a record is kept of the keys written from a specific node. The key for each of these bucket entries is created by combining the time segment and hostId, which usable to identify and/or address the device that hosts the sessionizer node. Each sessionizer node has a listener that listens to ring changes. When there is failure detected on one host, other hosts have a leader that reads the keys and their corresponding sessions from the expired node and closes them out. If the session is still valid, the session is kept; otherwise, the "session end marker event" is sent out.

Figure 15:
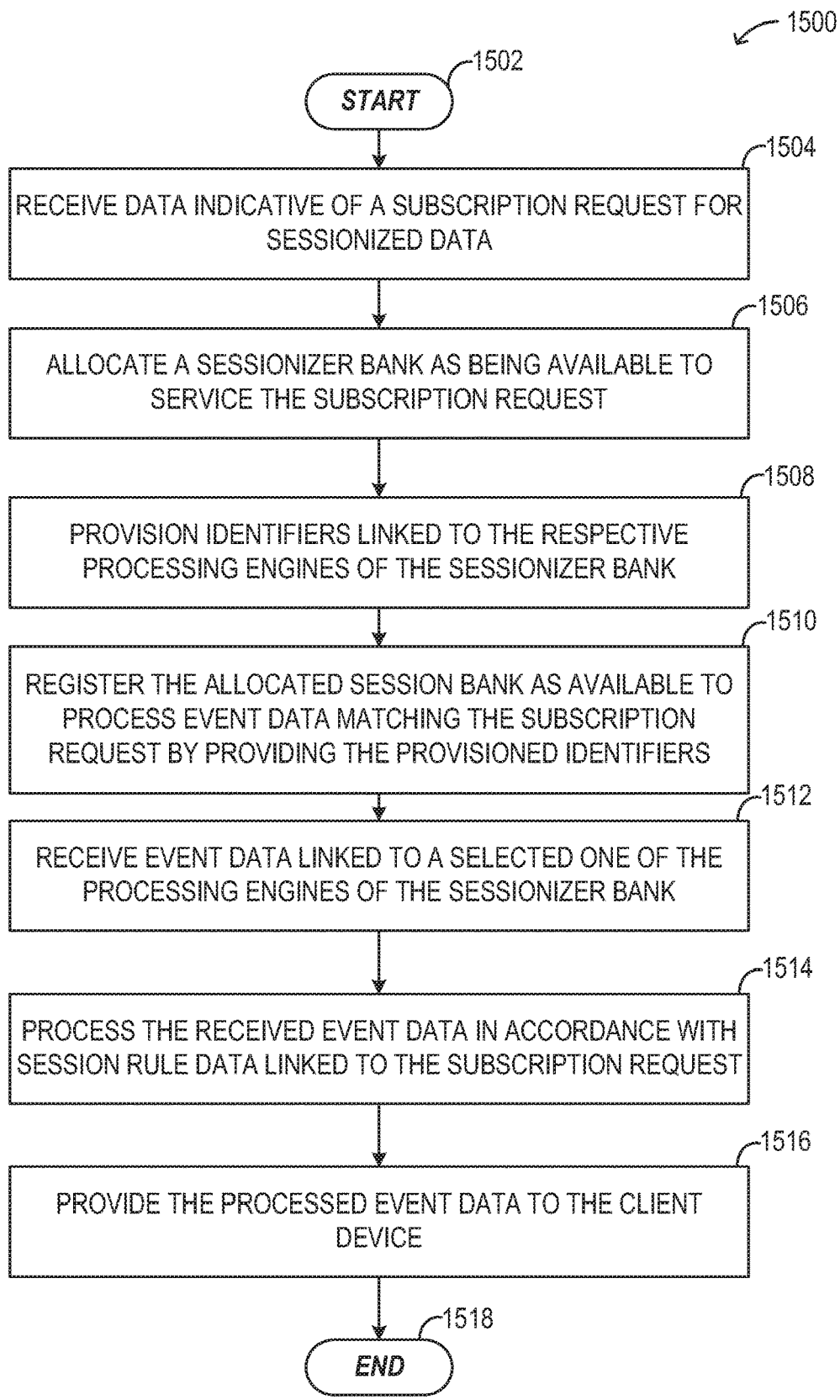
FIG. 15 is a flowchart illustrating an example method of generating the sessionized data, in accordance with an example embodiment.

FIG. 15 is a flowchart illustrating an example method 1500 of generating the sessionized data, in accordance with an example embodiment. In this example, the method 1500 can include operations such as receiving data indicative of a subscription request for sessionized data (block 1504), allocating a sessionizer bank linked to the subscription request (block 1506), provisioning identifier linked to the respective processing engines of the sessionizer bank (block 1508), registering the allocated sessionizer bank as available to process event messages (block 1510), receiving event messages (block 1512), processing the received event messages (block 1514), and providing generated sessionized data (block 1516). The example method 1500 will be described below, by way of explanation, as being performed by certain modules. It will be appreciated, however, that the operations of the example method 1500 can be performed in any suitable order by any number of the modules shown in FIGS. 3 and 13.

The method 1500 starts at block 1502 and proceeds to block 1504, at which a subscription interface receives data indicative of a subscription request for sessionized data. The subscription request can include a subscriber identifier, the sessions of interest, and the like. The subscription request can be transmitted by the subscriber(s) 1240 of FIG. 12. The subscription interface can be implemented at the sessionizer cluster ring 1226 of FIG. 12. In an example embodiment, the subscription interface can correspond to the relay agent module(s) 304 of FIG. 3.

At block 1506, the allocation module(s) allocates a sessionizer bank (such as the sessionizer cluster ring 1226 of FIG. 12) for servicing the subscription request. The sessionizer bank comprises processing engines available to service the subscription request. The sessionizer bank is linked to the subscription request and the subscriber(s) 1240.

At block 1508, a messaging interface module provisions identifiers linked to the respective processing engines of the sessionizer bank. For example, the messaging interface module can be implemented by the messaging system 1224 of FIG. 12. Furthermore, the messaging system 1224 can implement the messaging system 300 described in connection with FIG. 3 for providing consistent hashing scheduling. As such, the identifiers linked to the respective processing engines can correspond to a number of hash values assigned to each of the processing engines of the sessionizer bank.

At block 1510, the messaging interface module registers with a collection server the allocated sessionizer bank as available to process event messages (or "event data") matching the subscription request by providing the provisioned identifiers. For example, the consumer devices 1228A-F of FIG. 12 provides advertisements to the messaging system 1224, relay agent modules (e.g., the Zookeeper transports 1230, 1232) interfaced with the collector cluster ring 1206, or a server (not shown) connected with the collector cluster ring 1206 configured to receive advertisements. As a result, the CEP engines 1208A-F can serve as producer devices with respect to the sessionizer cluster ring 1226.

At block 1510, the messaging interface module receives event messages from a processing engine linked to the collection server. For example, one of the CEP engines 1208A-F transmits an event message through the messaging system 1224 to a selected one of the consumer devices 1228A-F. The selection of the consumer device can be based on a consistent hashing scheduler.

At block 1514, the selected one of the consumer devices 1228A-F processes received event messages in accordance with session rule data linked to the subscription request to generate sessionized data. The session rule data correspond to one or more attributes (e.g., tuples of information) that the subscriber requested. At block 1516, providing the generated sessionized data to the subscriber(s) 1240. At block 1518, the method 1500 ends.

Figure 16:
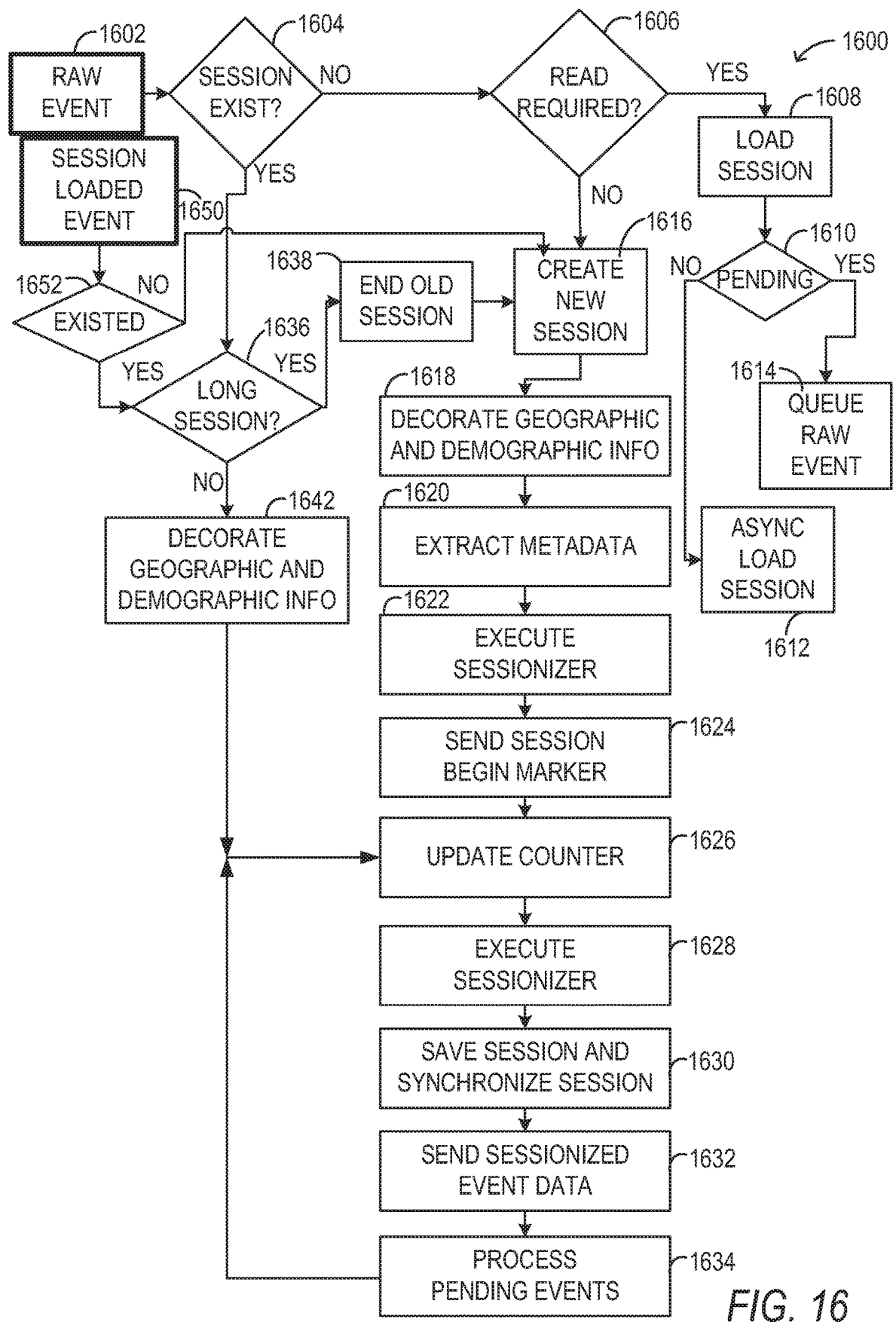
FIG. 16 is a flowchart illustrating an example method of generating and updating sessions, in accordance with an example embodiment.

FIG. 16 is a flowchart illustrating an example method 1600 of generating and updating sessions, in accordance with an example embodiment. In an example embodiment, the blocks 1602-1652 of the method 1600 can be performed by the consumer devices 1228A-F of FIG. 12.

The method 1600 can be triggered by receiving an event message. For example, the method 1600 can start at block 1602 in response to receiving an event message of a raw event type. For example, a raw event type corresponds to receiving an event message from a producer device that is not marked as containing an Internet bot program signature and/or if it is not marked to be bypassed by the sessionizer. At block 1604, the method 1600 determines whether a session exists for the raw event. In response a determination that a session does not exist, the method 1600 can proceed to block 1606 to determine whether a read is to be performed. In an example embodiment, a read is to be performed in response to a sessionizer node failure. If a read is to be performed, the method 1600 can proceed to block 1608 for loading a session and to block 1610 for determining whether a load is pending. If the load is not pending, the method performs an asynchronous load of a session at block 1612. If the load is pending, the method 1600 queues the received raw event at block 1614.

Returning to the decision of block 1606, if the method 1600 determines that a read is not required then the method 1600 proceeds to block 1616 for creating a new session. The method 1600 proceeds to blocks 1618-1624 for decorating the received event message with geographic and demographic information, extracting metadata from the received event message, executing a sessionizer on the event message, and sending a session begin marker. At blocks 1626-1634, the method 1600 updates the counters associated with the decorated event message, executes a sessionizer, saves and synchronizes the session, sends the sessionized event messages to the subscriber, and processes pending events. After processing pending events at block 1634, the method 1600 can return to block 1626 for repeating the actions of block 1626-1634.

Returning to the decision of block 1604, in response a determination that a session for the received event message exists, the method 1600 proceeds to block 1636 for determining whether the existing session is long based on the session duration. For example, an existing session is long when it has expired based on the latest cached event messaged being past the session duration. Based on a determination that the session is long, the method 1600 proceeds to block 1602 to end the old session and create a new session at block 1616, after which the method 1600 executes block 1618-1634 as described above. If instead the method determines that the session is not long at block 1636, the method proceeds to block 1642 to decorate the event message with geographic and demographic information and then proceeds to block 1626-1634 as described above.

The method 1600 can also be triggered by receiving data indicative of a session load event, such as a request to load a selected session. The method 1600 can start at block 1650 and proceed to block 1650 to determine whether or not the session exists. Based on a determination that the session does exist the method 1600 proceeds to block 1636 to determine whether or not the session is long and continues as described above. Based on a determination that the session does not exist, the method 1600 proceeds to block 1638 to end the old session and proceeds to block 1616 as described above.

Figure 17:
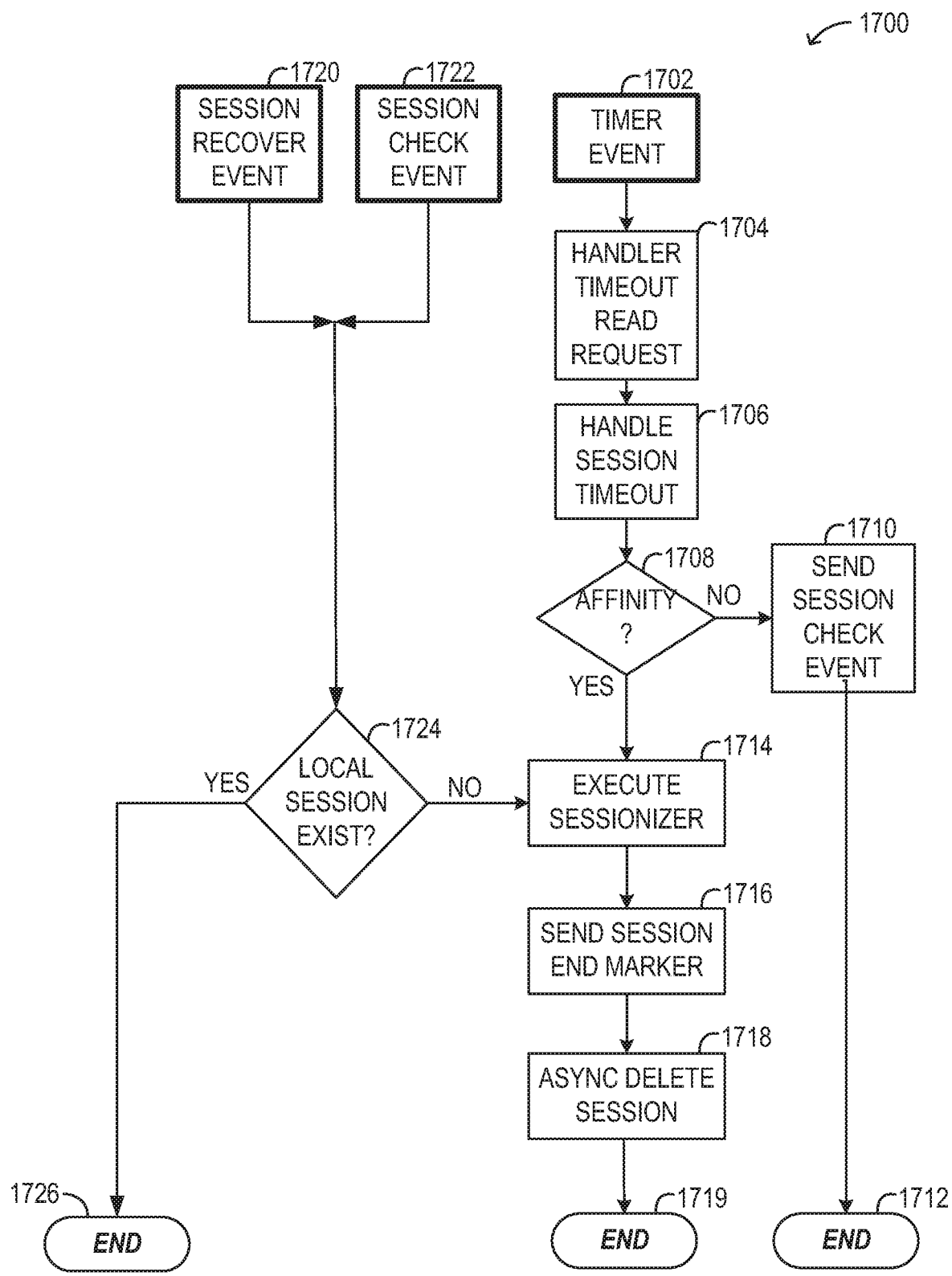
FIG. 17 is a flowchart illustrating an example method of session lifecycle management, in accordance with an example embodiment.

FIG. 17 is a flowchart illustrating an example method of session lifecycle management, in accordance with an example embodiment. In an example embodiment, the blocks 1702-1752 of the method 1700 can be performed by the consumer devices 1228A-F of FIG. 12. The execution of the method 1700 can be executed in response to a number of events, such as a timer event, a session check event, and a session recover event. In response to a timer event, the method 1700 starts at block 1702 and proceeds to block 1704 to handle a timeout read request. At block 1706, the method 1700 handles the session timeout and then proceeds to block 1708 to check the affinity. For example, an affinity exists if there is a sessionizer node that is assigned to receive event messages for the corresponding session and tenant of the time out event. Based on a determination that there is no affinity, the method 1700 proceeds to block 1710 to send a session check event and then ends at block 1712 (and, e.g., repeating the method 1700 starting at block 1722). Alternatively, based on a determination that there is an affinity, the method 1700 proceeds to block 1714 to execute the sessionizer. The method then proceeds to blocks 1716, 1718 to send a session end marker and then to delete the session. Afterwards, the method 1700 proceeds to block 1719 to end.

In response to either a session recover event (block 1720) or session check event (block 1722), the method 1700 proceeds to block 1724 to determine whether a local session exists. A local session is session data stored in an off heap cache of a sessionizer node and which is backed up in a backing store, such as the Kafka queues 1234, 1236 of FIG. 12. Based on a determination that a local session does exist, the method 1700 proceeds to block 1726 and ends. Alternatively, based on a determination that a local session does not exist, the method 1700 proceeds to block 1714 to execute the sessionizer and then proceed to blocks 1716-1719 as described above.

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network 104 (e.g., the Internet) and via one or more appropriate interfaces (e.g., application program interfaces (APIs).)

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 104.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., a field programmable gate array (FPGA) or an application-specific integrated circuit (ASIC).

The computing system can include clients and servers. A client and server are generally remote from each other and typically interact through a communication network 104. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 18:
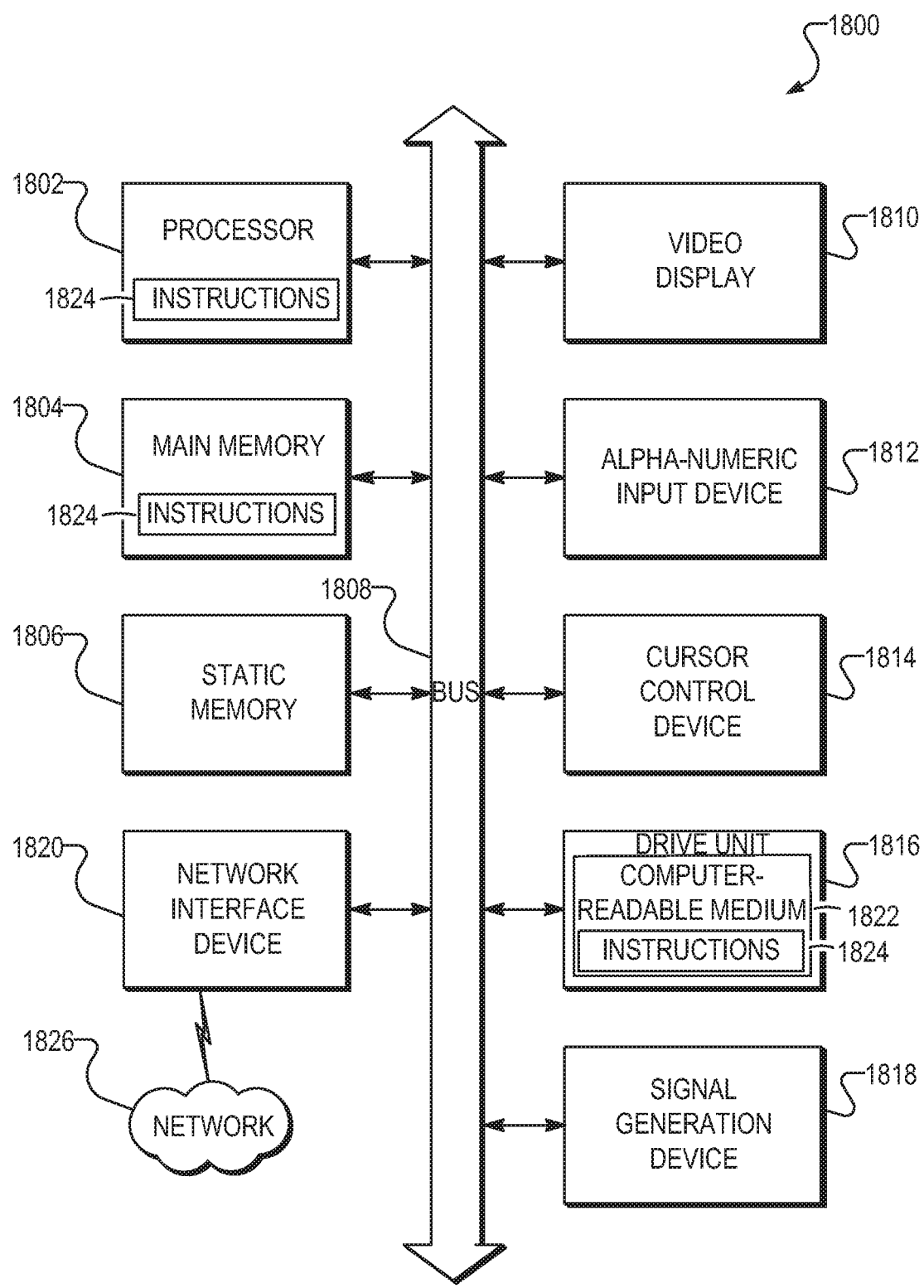
FIG. 18 is a block diagram of a machine in the example form of a computer system within which instructions can be executed for causing the machine to perform any one or more of the methodologies discussed herein.

FIG. 18 is a block diagram of a machine in the example form of a computer system 1800 within which instructions 1824 can be executed for causing the machine to perform any one or more of the methodologies discussed herein. In alternative embodiments, the machine operates as a stand-alone device or can be connected (e.g., networked) to other machines. In a networked deployment, the machine can operate in the capacity of a server or a client machine 110 in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions 1824 (sequential or otherwise) that specify actions to be taken by that machine. Further, while only a single machine is illustrated, the term "machine" shall also be taken to include any collection of machines that individually or jointly execute a set (or multiple sets) of instructions 1824 to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 can further include a video display unit 1810 (e.g., a liquid crystal display (LCD) or a cathode ray tube (CRT)). The computer system 1800 also includes an alphanumeric input device 1812 (e.g., a keyboard or a touch-sensitive display screen), a user interface (UI) navigation (or cursor control) device 1814 (e.g., a mouse), a disk drive unit 1816, a signal generation device 1818 (e.g., a speaker) and a network interface device 1820.

The disk drive unit 1816 includes a computer-readable medium 1822 on which is stored one or more sets of data structures and instructions 1824 (e.g., software) embodying or utilized by any one or more of the methodologies or functions described herein. The instructions 1824 can also reside, completely or at least partially, within the main memory 1804 and/or within the processor 1802 during execution thereof by the computer system 1800, the main memory 1804 and the processor 1802 also constituting machine-readable media 1822.

While the computer-readable medium 1822 is shown, in an example embodiment, to be a single medium, the term "computer-readable medium" can include a single medium or multiple media (e.g., a centralized or distributed database, and/or associated caches and servers) that store the one or more instructions 1824 or data structures. The term "computer-readable medium" shall also be taken to include any non-transitory, tangible medium that is capable of storing, encoding or carrying instructions 1824 for execution by the machine and that cause the machine to perform any one or more of the methodologies of the present inventive subject matter, or that is capable of storing, encoding or carrying data structures utilized by or associated with such instructions 1824. The term "computer-readable medium" shall accordingly be taken to include, but not be limited to, solid-state memories, and optical and magnetic media. Specific examples of computer-readable media 1822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 1824 can further be transmitted or received over a communications network 1826 using a transmission medium. The instructions 1824 can be transmitted using the network interface device 1820 and any one of a number of well-known transfer protocols (e.g., hypertext transfer protocol (HTTP)). Examples of communication networks 1826 include a local area network (LAN), a WAN, the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions (e.g., instructions 1824) for execution by the machine, and includes digital or analog communications signals or other intangible media to facilitate communication of such software.

Although the inventive subject matter has been described with reference to specific example embodiments, it will be evident that various modifications and changes can be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A method comprising:
  receiving, at a sessionization architecture, a plurality of event messages;
  detecting that an event message of the plurality event messages is marked as a particular bot type;
  responsive to the event message of the plurality of event messages being marked as a particular bot type, transmitting the event message to a bot detector, the transmitting the event message to the bot detector causing a bypass of one or more sessionizers of the sessionizatin architecture, and
  processing remaining event messages of the plurality of event messages through the one or more sessionizers.

2. The method of claim 1, further comprising:
  performing a lookup, in a bot signature cache, for patterns of events that represent an Internet bot signature; and
  responsive to the event message matching the Internet bot signature, marking the event message as the particular bot type.

3. The method of claim 2, wherein the marking the event message comprises adding metadata indicating the particular bot type to the event message.

4. The method of claim 2, wherein the performing the lookup and marking the event occurs at a collector tier prior to transmitting to the sessionization architecture.

5. The method of claim 4, wherein the collector tier comprises a collector cluster ring and the sessionization architecture comprises a sessionization cluster ring, the collector cluster ring including one or more complex event processing engines and the sessionization cluster ring including one or more consumer devices.

6. The method of claim 1, further comprising providing, by the bot detector, event messages to subscribers that have expressed interest in receiving events that contain metrics for different bot types.

7. The method of claim 1, further comprising:
  detecting a new bot signature; and
  updating a bot signature cache with the new bot signature.

8. The method of claim 1, further comprising detecting Internet bot program activities by observing a rate at which an Internet bot program is accessing a site using a bot signature and using a probabilistic frequency estimation technique measured over rolling windows of time.

9. A system comprising:
  one or more hardware processors; and
  a memory storing instructions that, when executed by the one or more hardware processors, causes the one or more hardware processors to perform operations comprising:
    receiving, at a sessionization architecture, a plurality of event messages;
    detecting that an event message of the plurality event messages is marked as a particular bot type;
    responsive to the event message of the plurality of event messages being marked as a particular bot type, transmitting the event message to a bot detector, the transmitting the event message to the bot detector causing a bypass of one or more sessionizers of the sessionization architecture, and
    processing remaining event messages of the plurality of event messages through the one or more sessionizers.

10. The system of claim 9, wherein the operations further comprise:
  performing a lookup, in a bot signature cache, for patterns of events that represent an Internet bot signature; and
  responsive to the event message matching the Internet bot signature, marking the event message as the particular bot type.

11. The system of claim 10, wherein the marking the event message comprises adding metadata indicating the particular bot type to the event message.

12. The system of claim 10, wherein the performing the lookup and marking the event occurs at a collector tier prior to transmitting to the sessionization architecture.

13. The system of claim 12, wherein the collector tier comprises a collector cluster ring and the sessionization architecture comprises a sessionization cluster ring, the collector cluster ring including one or more complex event processing engines and the sessionization cluster ring including one or more consumer devices.

14. The system of claim 9, wherein the operations further comprise providing, by the bot detector, event messages to subscribers that have expressed interest in receiving events that contain metrics for different bot types.

15. The system of claim 9, wherein the operations further comprise:
  detecting a new bot signature; and
  updating a bot signature cache with the new bot signature.

16. The system of claim 9, wherein the operations further comprise detecting Internet bot program activities by observing a rate at which an Internet bot program is accessing a site using a bot signature and using a probabilistic frequency estimation technique measured over rolling windows of time.

17. A non-transitory machine-readable storage medium embodying instructions that, when executed by a machine, cause the machine to perform operations comprising:

receiving, at a sessionization architecture, a plurality of event messages;

detecting that an event message of the plurality event messages is marked as a particular bot type;

responsive to the event message of the plurality of event messages being marked as a particular bot type, transmitting the event message to a bot detector, the transmitting the event message to the bot detector causing a bypass of one or more sessionizers of the sessionization architecture, and processing remaining event messages of the plurality of event messages through the one or more sessionizers.

18. The non-transitory machine-readable storage medium of claim 17, wherein the operations further comprise:

performing a lookup, in a bot signature cache, for patterns of events that represent an Internet bot signature; and responsive to the event message matching the Internet bot signature, marking the event message as the particular bot type.

19. The non-transitory machine-readable storage medium of claim 17, wherein the operations further comprise providing, by the bot detector, event messages to subscribers that have expressed interest in receiving events that contain metrics for different bot types.

20. The non-transitory machine-readable storage medium of claim 17, wherein the operations further comprise:

detecting a new bot signature; and updating a bot signature cache with the new bot signature.

* * * * *